US012683328B2

(12) United States Patent
Zhang

(10) Patent No.: US 12,683,328 B2
(45) Date of Patent: Jul. 14, 2026

(54) ELECTRICAL CONNECTOR WITH FIXED HOUSING, FLOATING HOUSING, ELASTIC TERMINAL MOUNTED THEREIN AND ELECTRICAL CONNECTOR ASSEMBLY USING THE SAME

(71) Applicant: Molex, LLC, Lisle, IL (US)

(72) Inventor: Xue-Hai Zhang, Shanghai (CN)

(73) Assignee: Molex, LLC, Lisle, IL (US)

( * ) Notice: Subject to any disclaimer, the term of this patent is extended or adjusted under 35 U.S.C. 154(b) by 289 days.

(21) Appl. No.: 18/238,547

(22) Filed: Aug. 28, 2023

(65) Prior Publication Data

US 2024/0079824 A1 Mar. 7, 2024

(30) Foreign Application Priority Data

Sep. 7, 2022 (CN) ........................ 202211091215.X

(51) Int. Cl.
*H01R 13/631* (2006.01)
*H01R 12/57* (2011.01)
(Continued)

(52) U.S. Cl.
CPC ......... *H01R 13/6315* (2013.01); *H01R 12/57* (2013.01); *H01R 12/716* (2013.01);
(Continued)

(58) Field of Classification Search
CPC .. H01R 13/6315; H01R 12/57; H01R 12/716; H01R 12/91; H01R 13/40; H01R 13/502; H01R 13/6582; H01R 24/00; H01R 24/38; H01R 24/50; H01R 12/51; H01R 12/55; H01R 12/712; H01R 12/714; H01R 13/11; H01R 13/111; H01R 13/46; H01R 13/506; H01R 13/514; H01R 13/631; H01R 13/646; H01R 13/6473; H01R 13/6474; H01R 13/6594; H01R 24/40; H01R 24/42; H01R 24/44; H01R 2103/00
See application file for complete search history.

(56) References Cited

U.S. PATENT DOCUMENTS 7,484,965 B2 2/2009 Chien et al.
9,620,900 B2 4/2017 Yanase et al.
(Continued)

FOREIGN PATENT DOCUMENTS

CN 109994854 A 7/2019
JP 2006066281 A 3/2006
(Continued)

*Primary Examiner* — Justin M Kratt

(57) ABSTRACT

An electrical connector and an electrical connector assembly include an insulative fixing seat, an insulative floating seat floatingly mounted thereabove, a floating terminal and a conductive shell. The fixing seat has a terminal fixing groove which extends horizontally. The floating seat has an insertion hole, an outer wall having an annular groove. The floating terminal includes a float connecting portion elastically connected between a mating portion and a horizontal fixing portion and is floatingly received in the fixing seat. The mating portion extends into the insertion hole, the conductive shell sheathes the fixing seat, the conductive shell has a plurality of elastic mating pieces having tips extending into the annular groove.

18 Claims, 23 Drawing Sheets

(51) Int. Cl.

| | |
|---|---|
| ***H01R 12/71*** | (2011.01) |
| ***H01R 12/91*** | (2011.01) |
| ***H01R 13/40*** | (2006.01) |
| ***H01R 13/502*** | (2006.01) |
| ***H01R 13/6582*** | (2011.01) |
| ***H01R 24/00*** | (2011.01) |
| ***H01R 24/38*** | (2011.01) |
| ***H01R 24/50*** | (2011.01) |
| *H01R 12/51* | (2011.01) |
| *H01R 12/55* | (2011.01) |
| *H01R 13/11* | (2006.01) |
| *H01R 13/46* | (2006.01) |
| *H01R 13/506* | (2006.01) |
| *H01R 13/514* | (2006.01) |
| *H01R 13/646* | (2011.01) |
| *H01R 13/6473* | (2011.01) |
| *H01R 13/6474* | (2011.01) |
| *H01R 13/6594* | (2011.01) |
| *H01R 24/40* | (2011.01) |
| *H01R 24/42* | (2011.01) |
| *H01R 24/44* | (2011.01) |
| *H01R 103/00* | (2006.01) |

(52) U.S. Cl.

CPC ............. *H01R 12/91* (2013.01); *H01R 13/40* (2013.01); *H01R 13/502* (2013.01); *H01R 13/6582* (2013.01); *H01R 24/00* (2013.01); *H01R 24/38* (2013.01); *H01R 24/50* (2013.01); *H01R 12/51* (2013.01); *H01R 12/55* (2013.01); *H01R 12/712* (2013.01); *H01R 12/714* (2013.01); *H01R 13/11* (2013.01); *H01R 13/111* (2013.01); *H01R 13/46* (2013.01); *H01R 13/506* (2013.01); *H01R 13/514* (2013.01); *H01R 13/631* (2013.01); *H01R 13/646* (2013.01); *H01R 13/6473* (2013.01); *H01R 13/6474* (2013.01); *H01R 13/6594* (2013.01); *H01R 24/40* (2013.01); *H01R 24/42* (2013.01); *H01R 24/44* (2013.01); *H01R 2103/00* (2013.01)

(56) References Cited

U.S. PATENT DOCUMENTS

| | | | | |
|---|---|---|---|---|
| 9,905,968 | B2 * | 2/2018 | Yanase ............... | H01R 13/6315 |
| 10,840,642 | B2 | 11/2020 | Kwon et al. | |
| 2023/0291148 | A1 * | 9/2023 | Tanaka ............... | H01R 13/6315 |

FOREIGN PATENT DOCUMENTS

| | | | |
|---|---|---|---|
| JP | 2019021573 | A | 2/2019 |
| JP | 3225606 | U | 3/2020 |
| TW | M623922 | U | 3/2022 |
| WO | 2017022141 | A1 | 2/2017 |
| WO | 2022030226 | A1 | 2/2022 |
| WO | 2022092223 | A1 | 5/2022 |

* cited by examiner

ELECTRICAL CONNECTOR WITH FIXED HOUSING, FLOATING HOUSING, ELASTIC TERMINAL MOUNTED THEREIN AND ELECTRICAL CONNECTOR ASSEMBLY USING THE SAME

RELATED APPLICATION

This application claims priority to Chinese Utility Application No. 202211091215.X, which was filed Sep. 7, 2022; the contents therein are incorporated by reference in its entirety.

TECHNICAL FIELD

The present disclosure relates to the field of electrical connectors, and particularly relates to an electrical connector which is capable of be floatingly connected with another electrical connector.

BACKGROUND

Electrical connectors are used to realize connection between electronic devices or connection between an electronic device and an electrical cable. Connection between the electrical connectors is generally realized by a male connector and a female connector which insert into and cooperate with each other. The male connector generally includes: an insulative seat, a central conductive member which is provided in the insulative seat, and a grounding shell which is provided outside the insulative seat. The female connector generally includes: a mating terminal which is used to mate with the central conductive member of the male connector, a conductive shell which is used to mate with the grounding shell of the male connector, and an insulative seat which is interposed between the mating terminal and the conductive shell. But due to assembling tolerance, it often results in that there is an axial or radial misalignment between the male connector and the female connector, which in turn results in mating between the male connector and the female connector is difficult, or even mating between the male connector and the female connector can be achieved under such a difficulty, that there is the misalignment between the central conductive member and the mating terminal results in poor contact between the central conductive member and the mating terminal, in turn reliability of signal transmission is affected.

With respect to this problem, the market offers a floating-type male connector, a central conductive member and a conductive shell of such a male connector has a certain floating space to be adapted to assembling tolerance between the male connector and the female connector. However, such a male connector is limited in floating range, and is poor in flexibility, when such a male connector is applied in means of transportation, such as vehicles and the like, which frequently vibrates under an use circumstance thereof, the male connector is often misaligned due to vibrating, signal transmission in the male connector often is interrupted even the male connector is damaged, so it needs to be further improved.

SUMMARY

A technical problem to be solved by the present disclosure is to provide an electrical connector and an electrical connector assembly which are capable of being better adapted to assembling tolerance and also can normally operate under a vibrating circumstance in order to overcome the deficiency existing in above prior art.

According to one aspect of the present disclosure, the present disclosure provides an electrical connector comprising: an insulative fixing seat which has a terminal receiving groove therein, a bottom portion of the terminal receiving groove has a terminal fixing groove which extends horizontally; an insulative floating seat which is capable of being floatingly mounted above the insulative fixing seat, the insulative floating seat has an insertion hole which penetrates up and down, an outer wall of the insulative floating seat is provided with an annular groove; a floating terminal which is fixed in the insulative fixing seat, the floating terminal comprises a soldering tail portion, a horizontal fixing portion which is connected with the soldering tail portion and extends horizontally, a mating portion and a float connecting portion which is elastically connected between the mating portion and the horizontal fixing portion and formed by bending multiple times, the horizontal fixing portion is fixed in the terminal fixing groove, the float connecting portion is capable of being floatingly received in the terminal receiving groove, the mating portion upwardly extends into the insertion hole of the insulative floating seat; and a conductive shell which sheathes an outer side of the insulative fixing seat, the conductive shell has a plurality of elastic mating pieces which extend upwardly, a tip of the elastic mating piece extends into the annular groove.

In an embodiment, the float connecting portion of the floating terminal comprises three straight extending portions which sequentially bend and extend, any two straight extending portions of the three straight extending portions are perpendicular to each other.

In an embodiment, the float connecting portion comprises: a first bending portion which is connected with the mating portion, a first straight extending portion which is connected with the first bending portion and extends horizontally, a second bending portion which bends downwardly from the first straight extending portion by 90 degrees, a second straight extending portion which is connected with the second bending portion and extends vertically, a third bending portion which bends horizontally from the second straight extending portion by 90 degrees, a third straight extending portion which is connected with the third bending portion and extend vertically and a fourth bending portion which is connected with the third straight extending portion; the horizontal fixing portion is connected with the fourth bending portion.

In an embodiment, two opposite sides of the first straight extending portion each have a bending arm which extends downwardly, the bending arm has a free end which is suspended.

In an embodiment, the horizontal fixing portion of the floating terminal extends horizontally just below the mating portion; or the horizontal fixing portion of the floating terminal extends horizontally offset just below the mating portion.

In an embodiment, the mating portion of the floating terminal comprises two mating elastic pieces which are provided to face each other, cross sections of the two mating elastic pieces are arcs which curve toward each other, corresponding sides of lower portions of the two mating elastic pieces are connected, upper portion of the two mating elastic pieces are separated from each other, and the two mating elastic pieces therebetween form an inserting cavity which penetrates up and down, the two mating elastic pieces gather toward a center of the inserting cavity at positions of the two mating elastic pieces close to upper ends of the two mating elastic pieces to form a necking portion.

In an embodiment, the mating portion sequentially from down to up comprises: a straight barrel portion, a cone barrel portion which is formed by tapering upwardly a caliber thereof from the straight barrel portion, and an inserting guide portion which is formed upwardly from the cone barrel portion and is horn-shaped; the necking portion is formed at a boundary position between the cone barrel portion and the inserting guide portion.

In an embodiment, the mating portion has a first slit and a second slit, the first slit extends downwardly from an upper end of the inserting guide portion to the straight barrel portion and cut through the straight barrel portion, the second slit extends downwardly from the upper end of the inserting guide portion to the straight barrel portion but does not cut through the straight barrel portion, the float connecting portion is connected to a lower end of the straight barrel portion and is positioned just below the second slit.

In an embodiment, the terminal receiving groove and the float connecting portion have a gap therebetween, the terminal receiving groove has spacing members which extend into between various portion of the float connecting portion.

In an embodiment, the insulative fixing seat comprises a main fixing seat and an auxiliary fixing seat, the terminal receiving groove is opened at a side of the main fixing seat and forms a lateral opening at a side surface of the main fixing seat, the auxiliary fixing seat is snapped to the lateral opening, the auxiliary fixing seat is provided with a spacing block, the spacing block is interposed between the bending arm of the floating terminal and the horizontal fixing portion of the floating terminal.

In an embodiment, the terminal receiving groove partitions an inner wall of the main fixing seat into two position-limiting walls which face each other, the two position-limiting walls are respectively provided with snapping grooves, the auxiliary fixing seat are provided thereon with snapping blocks which respectively snap with the snapping grooves.

In an embodiment, one of the two position-limiting walls of the main fixing seat is further provided with a stopping wall which protrudes, the stopping wall stops below the first bending portion.

In an embodiment, the terminal receiving groove is provided at a side of the insulative fixing seat and partitions the insulative fixing seat into a first position-limiting wall and a second position-limiting wall which face each other, the first position-limiting wall is provided with a partitioning wall which extends horizontally toward the second position-limiting wall, the partitioning wall and the second position-limiting wall have a gap therebetween, the partitioning wall extends into below the first straight extending portion, the partitioning wall and the first straight extending portion has an interval therebetween, the second straight extending portion inserts into the gap and is capable of floating in the gap.

In an embodiment, the first position-limiting wall and the second position-limiting wall are respectively provided with a first inserting groove and a second inserting groove respectively at a position which is close to a bottom end of the first position-limiting wall and a position which is close to a bottom end of the second position-limiting wall, an opening of the first inserting groove and an opening of the second inserting groove face each other and together constitute the terminal fixing groove, two sides of the horizontal fixing portion of the floating terminal are respectively snapped in the first inserting groove and the second inserting groove.

In an embodiment, the insulative floating seat comprises a barrel body which is barrel-shaped, the annular groove is provided to an upper portion of the insulative floating seat and encircles around the barrel body, a protruding ring protruding outwardly is formed on an outer wall of the barrel body adjacent to below the annular groove.

In an embodiment, the conductive shell comprises a sleeve portion which sheathes the insulative fixing seat, the elastic mating pieces are distributed to be spaced apart from each other along an upper end of the sleeve portion and form a cage shape, an upper end of the elastic mating piece bends toward a central axis of the conductive shell to form a bending hook, a tip of the bending hook extends into the annular groove, a lower end of the sleeve portion is provided with a soldering leg which extends outwardly.

According to another aspect of the present disclosure, the present disclosure provides an electrical connector assembly, comprising: a male connector; a main mounting housing which allows the male connector to insert therein; and the electrical connector which inserts into and cooperate with the male connector; the male connector comprises: a metal shell; a central conductive member which is received in the metal shell; and an insulative seat; the central conductive member is fixed on the insulative seat, the insulative seat is interposed between the metal shell and the central conductive member; the central conductive member and the mating portion of the floating terminal correspondingly contact to establish a first electrical connection, and the metal shell sheathes the conductive shell to establish a second electrical connection.

In comparison with the prior art, the present disclosure at least has the following advantages: the electrical connector and the electrical connector assembly of the present disclosure comprises the floating terminal, the insulative fixing seat and the insulative floating seat which are used to allow the floating terminal to be mounted thereon, and a conductive shell which sheathes the insulative fixing seat and the insulative floating seat. The floating terminal comprises a float connecting portion, the float connecting portion has good flexibility, is capable of being deformed in the various directions of the three-dimensional space, and, when the floating terminal floats, the insulative floating seat also may compliantly float under elastic constraint of the elastic mating piece of the conductive shell to comply with the deformation of the floating terminal, so as to ensure that the floating terminal may float in the up-down direction, the left-right direction the front-rear direction, make the floating terminal better adapted to assembling tolerance between the floating terminal and an electrical connector mated with the floating terminal, and under a vibrating circumstance, the floating terminal also can comply with vibrating to be deformed, maintain reliable mating with the electrical connector mated with the floating terminal, and ensure that the electrical connector normally operates under the vibrating circumstance.

DETAILED DESCRIPTION

While the present disclosure may be susceptible to embodiments in different forms, there are shown in the figures, and will be described herein in detail, are only specific embodiments, with the understanding that the present disclosure is to be considered as an exemplification of the principles of the present disclosure, and is not intended to limit the present disclosure to that as illustrated.

As such, references to a feature are intended to describe a feature of an embodiment of the present disclosure do not to imply that every embodiment thereof must have the described feature. Furthermore, it should be noted that the description illustrates a number of features. While certain features may be combined together to illustrate potential system designs, those features may also be used in other combinations not expressly described. Thus, the described combinations are not intended to be limiting, unless otherwise noted.

In the embodiments illustrated in the figures, representations of directions such as up, down, left, right, front and rear, used for explaining the structure and movement of the various components of the present disclosure, are not absolute, but relative. These representations are appropriate when the components are in the position shown in the figures. If the description of the position of the components changes, however, these representations are to be changed accordingly.

Figure 1:
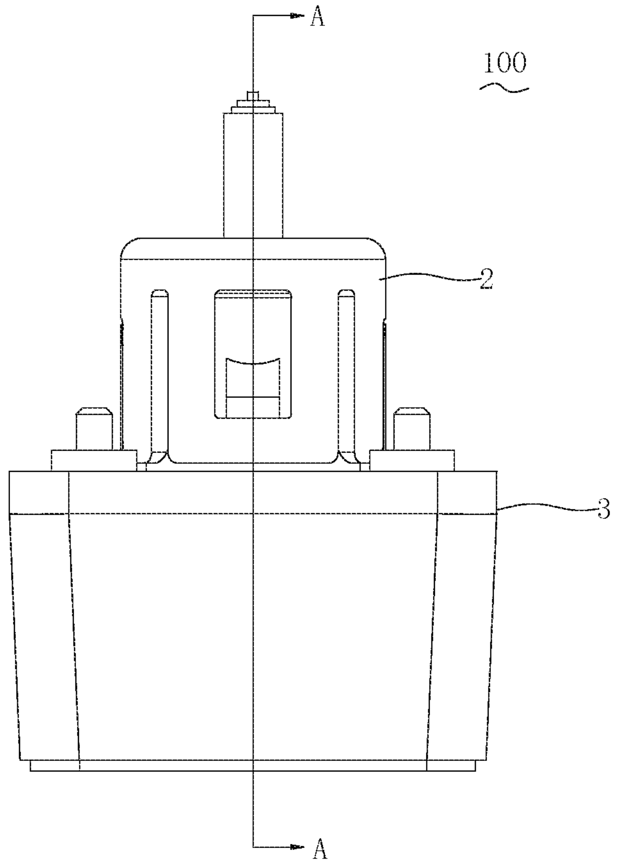
FIG. 1 is a side view of an electrical connector assembly of a first preferred embodiment of the present disclosure.
Figure 2:
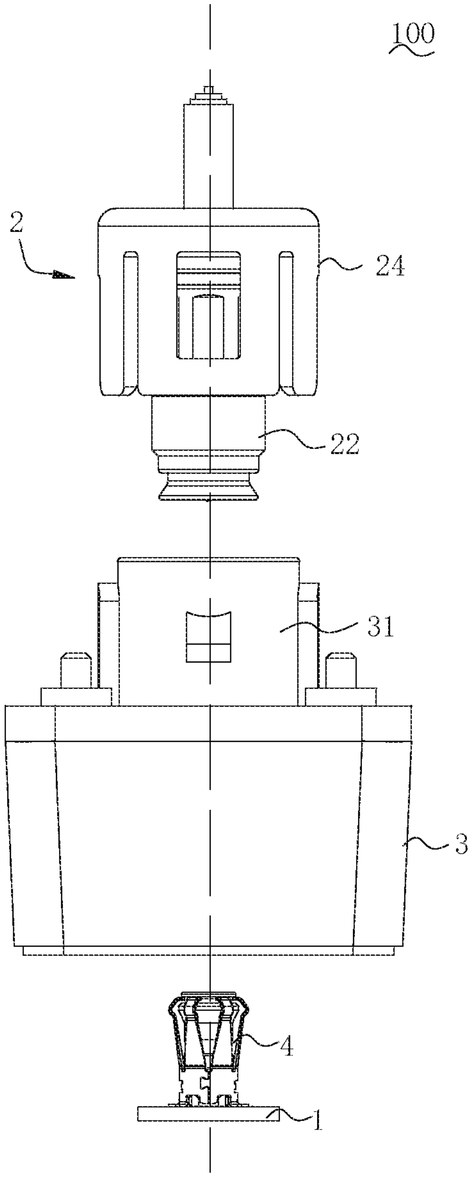
FIG. 2 is an exploded view of the electrical connector assembly of FIG. 1.
Figure 3:
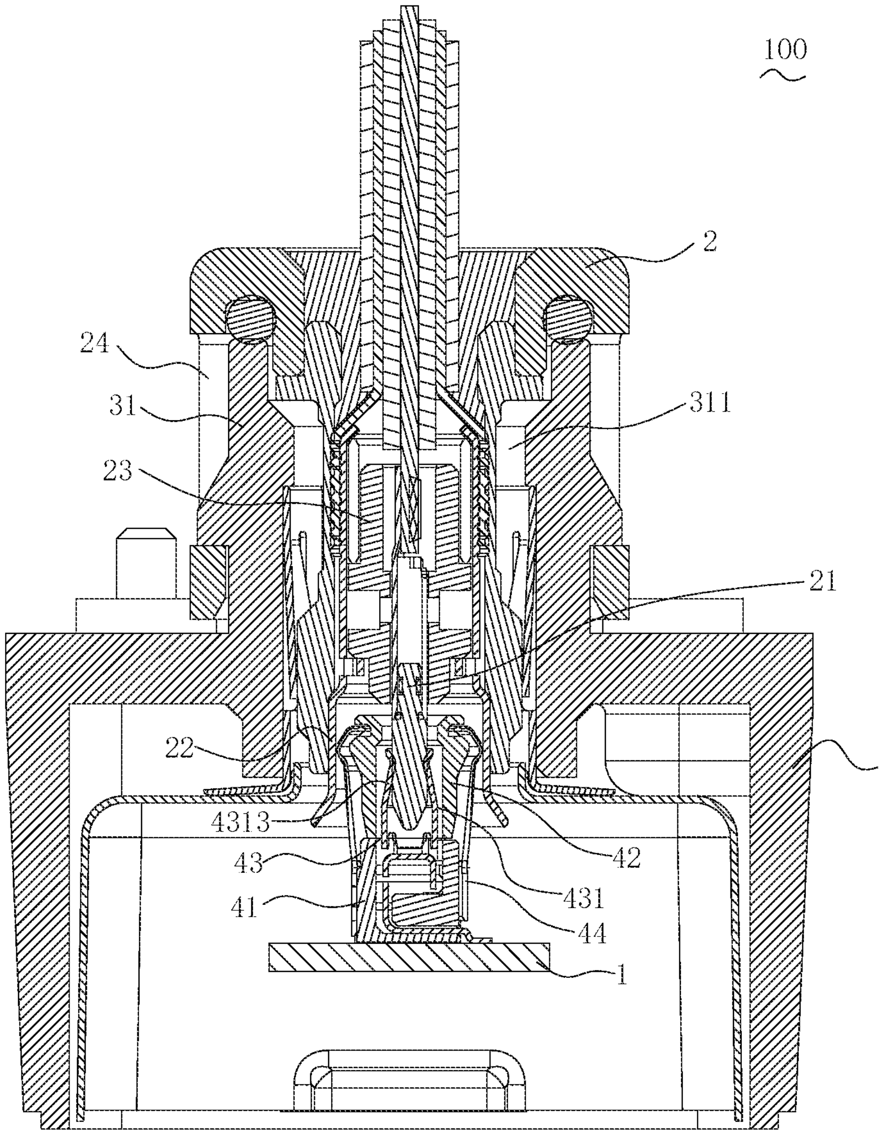
FIG. 3 is a cross sectional view of the electrical connector assembly taken along a line A-A of FIG. 1.

Referring to FIG. 1 to FIG. 3, the electrical connector assembly 100 includes: a male connector 2, a main mounting housing 3 which allows the male connector 2 to insert therein, and a female connector 4 which inserts into and cooperates with the male connector 2. The female connector 4 is mounted on a circuit board 1, the female connector 4 and the circuit board 1 together are received in the main mounting housing 3. The electrical connector assembly 100 may be adapted to connection between electronic devices or connection between an electronic device and an electrical cable so as to realize signal transmission. For example, the electronic device may be a wireless communication device, a tachograph, a vehicle navigation equipment, a vehicle audio or a vehicle control panel and the like.

The present disclosure mainly lies in structure improvement of the female connector, but in order to clearly describe structures of various parts of the female connector of the preferred embodiment and cooperating process between the female connector and the male connector, the present embodiment schematically examples a male connector 2 and a main mounting housing 3 which allows the male connector 2 to be mounted thereon.

Referring to FIG. 3, the male connector 2 includes: a metal shell 22, a central conductive member 21 and an insulative seat 23 which are received in the metal shell 22, and a locking cover 24 which sheathes the metal shell 22. The central conductive member 21 is fixed on the insulative seat 23, the insulative seat 23 is interposed between the metal shell 22 and the central conductive member 21 and makes the metal shell 22 and the central conductive member 21 insulated from each other. The metal shell 22 is used to shield a signal in the central conductive member 21 so as to filter a noise and promote fidelity performance of transmitted signal of the central conductive member 21. The locking cover 24 is used to mate with the main mounting housing 3 so as to lock the male connector 2 on the main mounting housing 3.

The main mounting housing 3 is provided thereon with a mating post 31, the mating post 31 is opened therein with a mounting passageway 311 which penetrates along an up-down direction. When the male connector 2 is mounted to the main mounting housing 3, the metal shell 22, the central conductive member 21 and the insulative seat 23 of the male connector 2 together are received in the mounting passageway 311, the locking cover 24 sheathes an outer wall of the mating post 31, and the locking cover 24 and the mating post 31 are cooperated with and locked with each other.

Hereinafter, in combination with the drawings, a preferred embodiment of the female connector will be further described in detail.

For sake of convenient description, an end of the female connector mating with the male connector is defined as "up" herein, and an end of the female connector away from the male connector is defined as "down" herein.

Figure 4A:
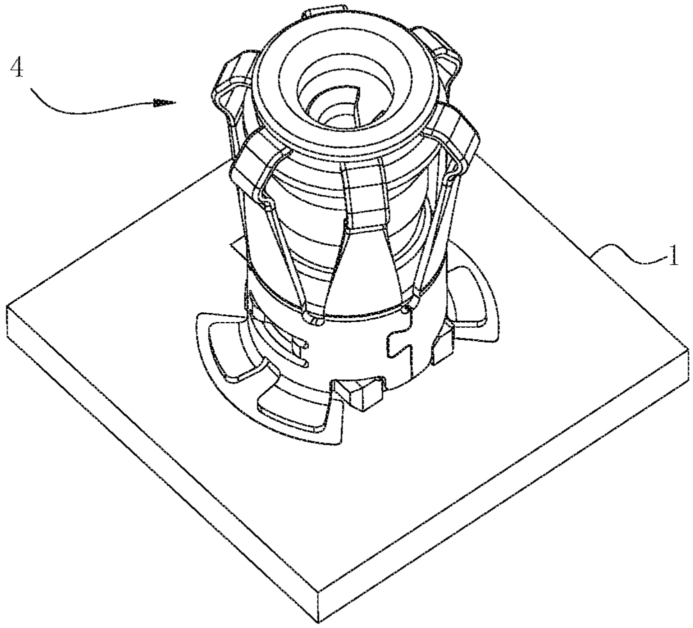
FIG. 4A is a perspective view of a female connector of FIG. 2 provided on a circuit board.
Figure 4B:
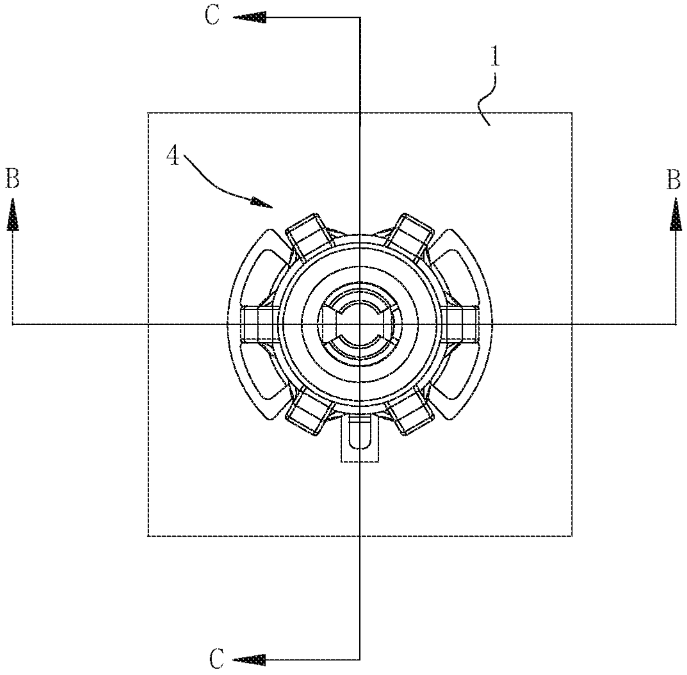
FIG. 4B is a top view of the female connector of FIG. 4A provided on the circuit board.
Figure 5:
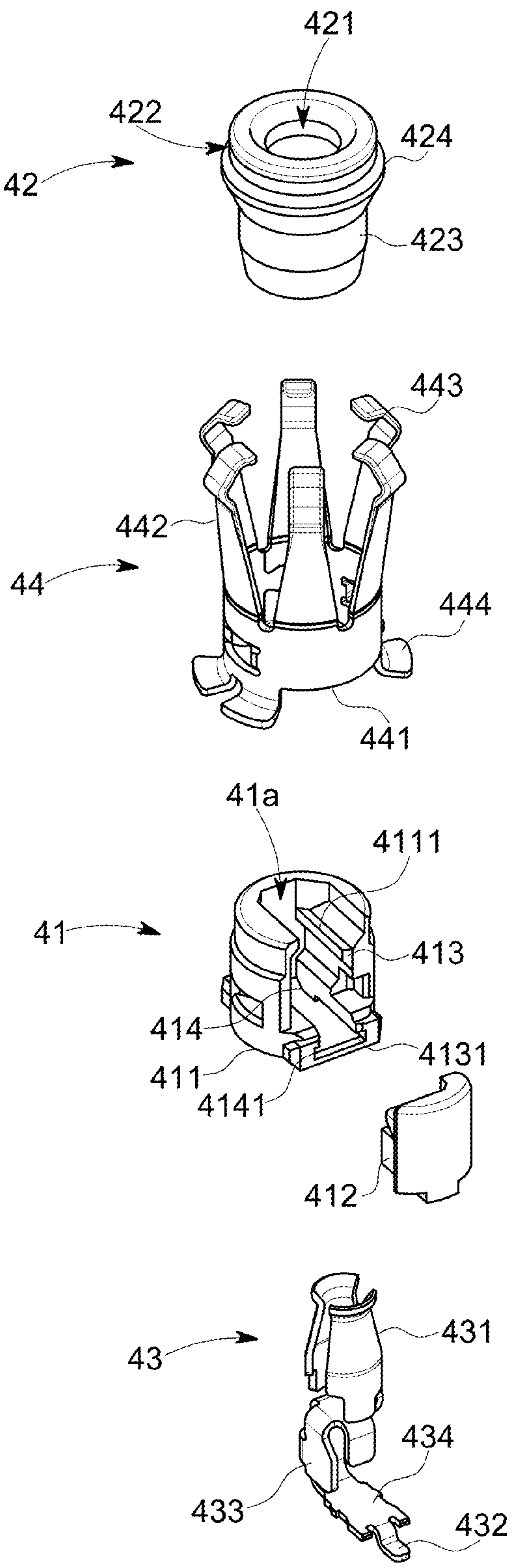
FIG. 5 is a perspective exploded view of the female connector of FIG. 4A.

Referring to FIG. 4A, FIG. 4B and FIG. 5, the female electrical connector 4 of the present embodiment includes an insulative fixing seat 41, an insulative floating seat 42, a floating terminal 43 and a conductive shell 44. The floating terminal 43 is received in the insulative fixing seat 41 and the insulative floating seat 42, and the insulative fixing seat 41, the insulative floating seat 42 and the floating terminal 43 together are received in the conductive shell 44. The insulative fixing seat 41 and the insulative floating seat 42 are interposed between the floating terminal 43 and the conductive shell 44 to make the floating terminal 43 and the conductive shell 44 insulated from each other.

Figure 6:
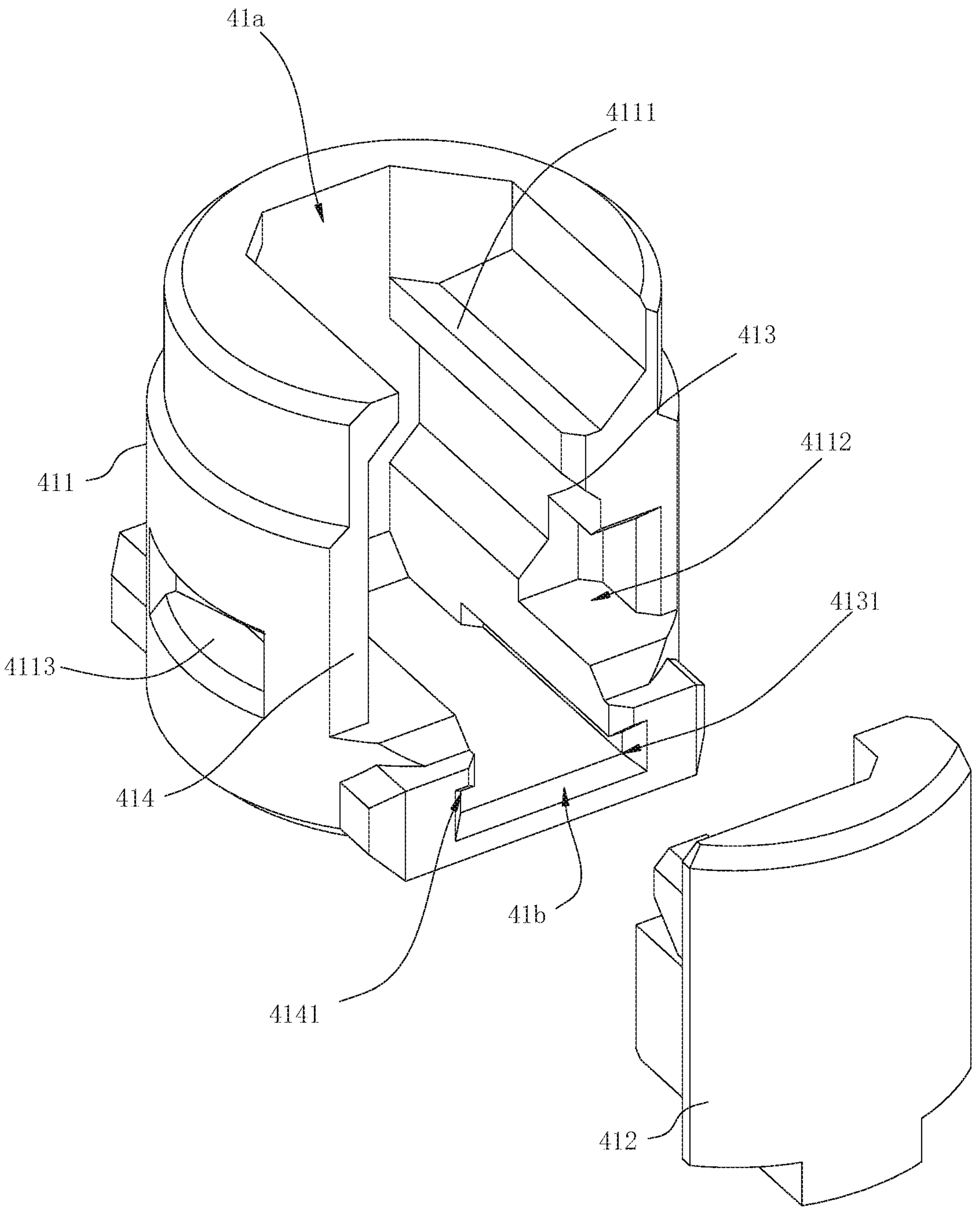
FIG. 6 is a perspective exploded view of an insulative fixing seat of the female connector of FIG. 5 viewed from an angle.
Figure 7:
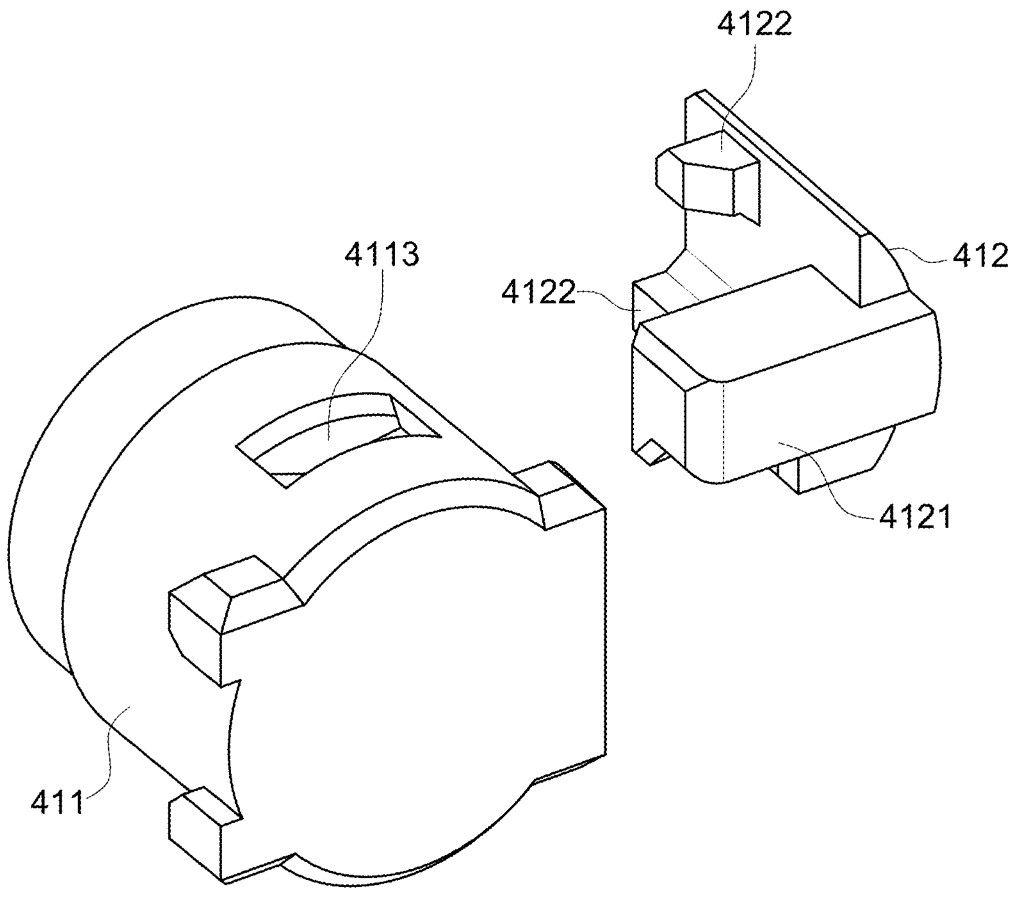
FIG. 7 is a perspective exploded view of the insulative fixing seat of the female connector of FIG. 5 viewed from another angle.

Referring to FIG. 6 and FIG. 7, the insulative fixing seat 41 includes a main fixing seat 411 and an auxiliary fixing seat 412.

The insulative fixing seat 41 has a terminal receiving groove 41*a*, the terminal receiving groove 41*a* is opened to a side of the insulative fixing seat 41 and extends into the insulative fixing seat 41. The terminal receiving groove 41*a* is used to receive the floating terminal 43. Specifically, in the present embodiment, the terminal receiving groove 41*a* partitions an inner wall of the main fixing seat 411 into a first position-limiting wall 413 and a second position-limiting wall 414 which face each other.

The terminal receiving groove 41*a* forms a lateral opening on a side surface of the main fixing seat 411, the auxiliary fixing seat 412 is snapped to the lateral opening so as to close the lateral opening. The first position-limiting wall 413 and the second position-limiting wall 414 are respectively provided thereon with snapping grooves 4112. The auxiliary fixing seat 412 is provided thereon with snapping blocks 4122 which snap with the snapping grooves 4112 respectively. The main fixing seat 411 and the auxiliary fixing seat 412 are connected with each other by that the snapping blocks 4122 and the snapping grooves 4112 snap with each other. The floating terminal 43 is mounted in the terminal receiving groove 41*a* via the lateral opening of the main fixing seat 411, the auxiliary fixing seat 412 is snapped to the lateral opening, so as to package the floating terminal 43 in the terminal receiving groove 41*a*. The auxiliary fixing seat 412 is provided thereon with a spacing block 4121 which protrudes, the spacing block 4121 extends into the terminal receiving groove 41*a* to perform position-limiting on the floating terminal 43 in the terminal receiving groove 41*a*.

A bottom portion of the terminal receiving groove 41*a* has a terminal fixing groove 41*b* which extends horizontally. Specifically, in the present embodiment, the first position-limiting wall 413 and the second position-limiting wall 414 are respectively opened with a first inserting groove 4131 and a second inserting groove 4141 respectively at a position which is close to a bottom end of the first position-limiting wall 413 and a position which is close to a bottom end of the second position-limiting wall 414, an opening of the first inserting groove 4131 and an opening of the second inserting groove 4141 face each other, and the first inserting groove 4131 and the second inserting groove 4141 together constitute the terminal fixing groove 41*b*. The terminal fixing groove 41*b* is used to fix the floating terminal 43.

The first position-limiting wall 413 of the main fixing seat 411 is provided thereon with a stopping wall 4111 which protrudes, the stopping wall 4111 is used to constitute position-limiting on the floating terminal 43 (described in detail below), an outer side surface of the insulative fixing seat 41 is further provided with at least one recessed groove 4113 which is used to fix the conductive shell 44.

Figure 8:
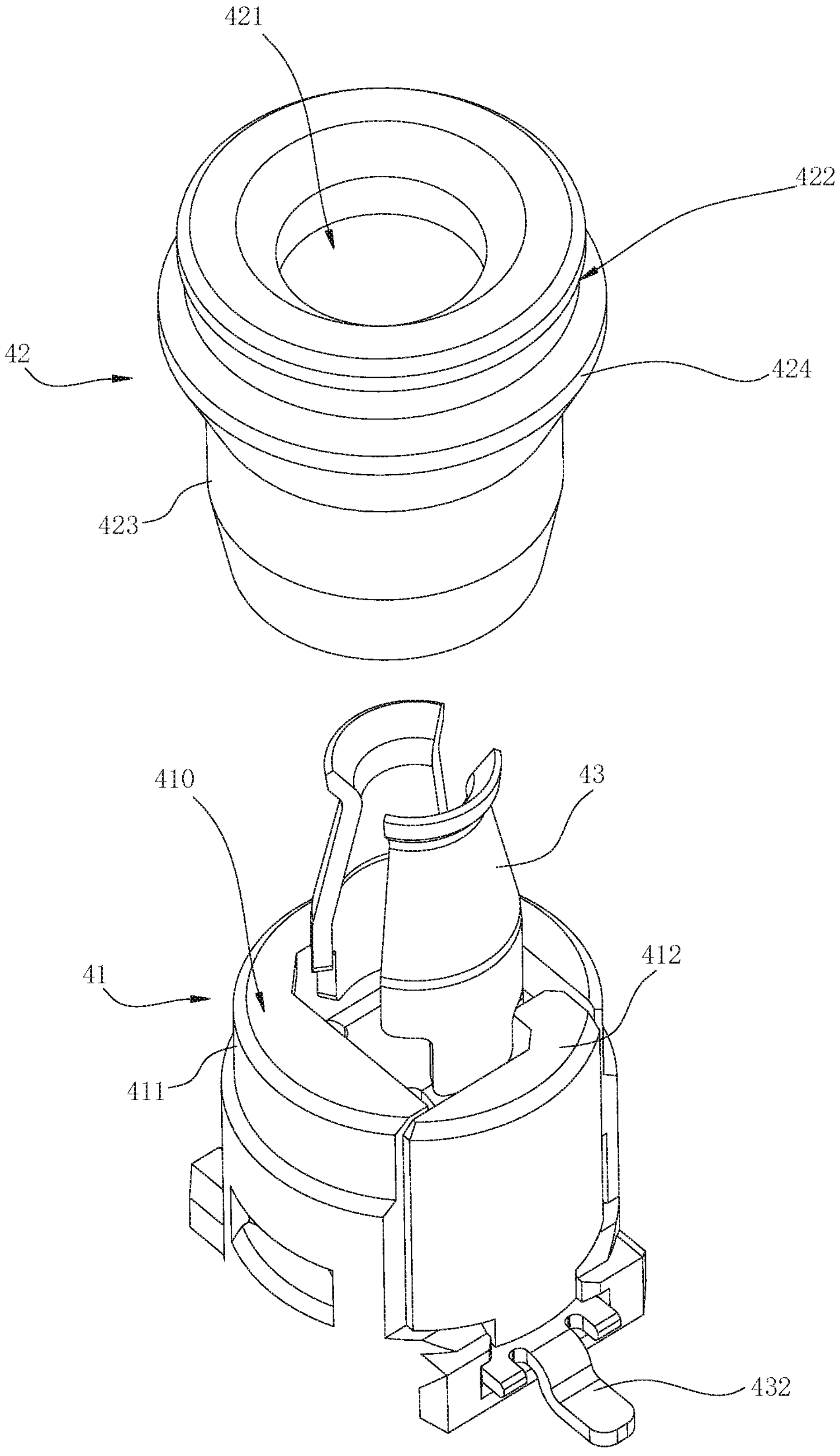
FIG. 8 is a perspective exploded view of an insulative floating seat the insulative fixing seat of the female connector of FIG. 5.

Referring to FIG. 8, the insulative floating seat 42 is floatingly mounted above the insulative fixing seat 41. Specifically, in the present embodiment, a top portion of the insulative fixing seat 41 has a supporting platform 410 which is horizontal, the insulative floating seat 42 slidably seats on the supporting platform 410, which thus realizes horizontal floating of the insulative floating seat 42, and there is not connecting constraint between the insulative floating seat 42 and the insulative fixing seat 41 up and down, so the insulative floating seat 42 may freely float up and down relative to the insulative fixing seat 41. But a floating extent of the insulative floating seat 42 is limited by the conductive shell 44 which sheathes the insulative fixing seat 41 and the insulative floating seat 42 (described in detail below). Moreover, in other embodiments not shown, the insulative fixing seat 41 may be provided thereon with a receiving groove, the insulative floating seat 42 is mounted in the receiving groove, the insulative floating seat 42 and the receiving groove have a gap therebetween to make the insulative floating seat 42 capable of floating along a horizontal direction and the up-down direction relative to the insulative fixing seat 41. Or, in other embodiment, it also may be that the insulative floating seat 42 is provided thereon with a receiving groove or a penetrating hole to make the insulative fixing seat 41 partially extend into the receiving groove or the penetrating hole of the insulative floating seat 42 and make the insulative fixing seat 41 and the receiving groove or the penetrating hole of the insulative floating seat 42 have a gap therebetween, which thus realize that the insulative floating seat 42 may freely float horizontally and up and down relative to the insulative fixing seat 41.

The insulative floating seat 42 has an insertion hole 421 which penetrates up and down, a lower portion of the floating terminal 43 is fixed in the insulative fixing seat 41, an upper portion of the floating terminal 43 extends into the insertion hole 421 of the insulative floating seat 42. The insulative floating seat 42 is provided with an annular groove 422 which is positioned at an upper portion of the insulative floating seat 42 and encircles around an outer wall of the upper portion of the insulative floating seat 42. The insulative floating seat 42 includes a barrel body 423 which is barrel-shaped. The insertion hole 421 penetrates the barrel body 423 up and down. Specifically, the annular groove 422 encircles the barrel body 423 and is positioned at a position of the barrel body 423 close to an upper end of the barrel body 423. A protruding ring 424 protruding outwardly is formed on an outer wall of the barrel body 423 adjacent to below the annular groove 422.

Figure 9:
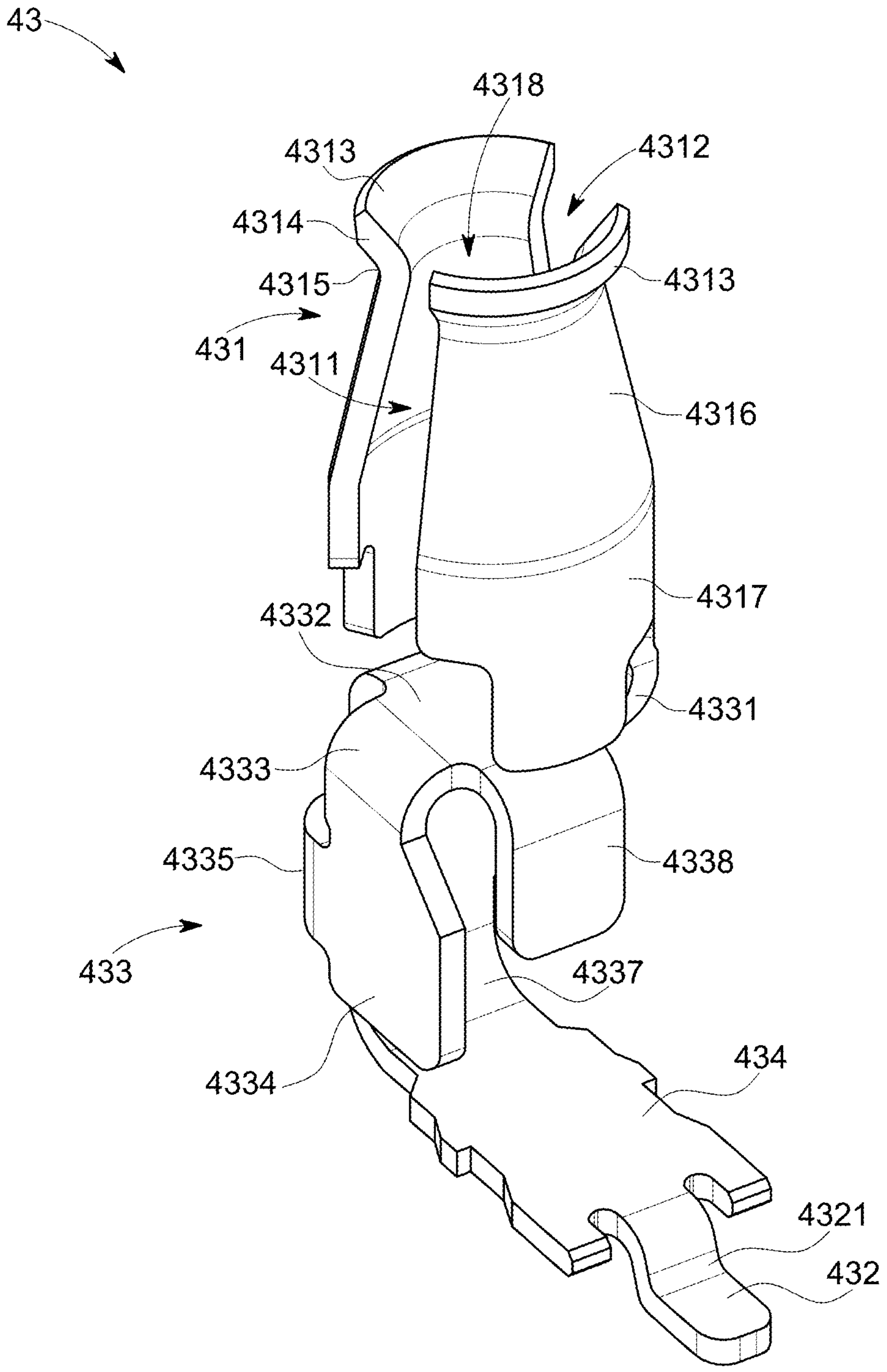
FIG. 9 is a perspective view of a floating terminal of the female connector of FIG. 5 viewed from an angle.

Referring to FIG. 9, the floating terminal 43 preferably is a metal conductive material having elasticity, includes a mating portion 431, a float connecting portion 433, a horizontal fixing portion 434 and a soldering tail portion 432 which are sequentially connected together. Here, the mating portion 431 and the soldering tail portion 432 are respectively positioned at two ends of the floating terminal 43, the float connecting portion 433 is connected between the mating portion 431 and the horizontal fixing portion 434, the horizontal fixing portion 434 is connected between the float connecting portion 433 and the soldering tail portion 432. The mating portion 431 is used to mate with the central conductive member 21 of the male connector 2, the soldering tail portion 432 is used to be soldered with the circuit board 1 so as to make the floating terminal 43 and the circuit board 1 electrically conducted. The float connecting portion 433 is used to make the floating terminal 43 realize floating up and down, left and right and front and rear, in turn make the floating terminal 43 realize floatingly mating with the male connector 2, the horizontal fixing portion 434 is used to fix a lower end of the floating terminal 43 on the insulative fixing seat 41.

Referring to FIG. 6 to FIG. 9, the mating portion 431 extends into the insertion hole 421 of the insulative floating seat 42, the float connecting portion 433 and the horizontal fixing portion 434 are received in the insulative fixing seat 41. Here, the float connecting portion 433 is received in the terminal receiving groove 41*a*, and the float connecting portion 433 and a groove wall of the terminal receiving groove 41*a* have a gap therebetween, so as to make the float connecting portion 433 capable of floating in the terminal receiving groove 41*a*. The horizontal fixing portion 434 is correspondingly received in the terminal fixing groove 41*b*, the soldering tail portion 432 is exposed outside the insulative fixing seat 41.

The horizontal fixing portion 434 extends horizontally just below the mating portion 431, the horizontal fixing portion 434 is received in the terminal fixing groove 41*b*, a thickness of the horizontal fixing portion 434 is matched with a height of the terminal fixing groove 41*b*, so as to assure that the horizontal fixing portion 434 tightly attaches with a groove wall of the terminal fixing groove 41*b*. Specifically, in the present embodiment, heights of the first inserting groove 4131 and the second inserting groove 4141 which constitute the terminal fixing groove 41*b* are matched with the thickness of the horizontal fixing portion 434, so as to make two sides of the horizontal fixing portion 434 respectively snapped in the first inserting groove 4131 and the second inserting groove 4141.

Meanwhile referring to FIG. 9, the soldering tail portion 432 is connected to a tip of the horizontal fixing portion 434, the soldering tail portion 432 and the horizontal fixing portion 434 are connected with a step portion 4321 therebetween.

Figure 10:
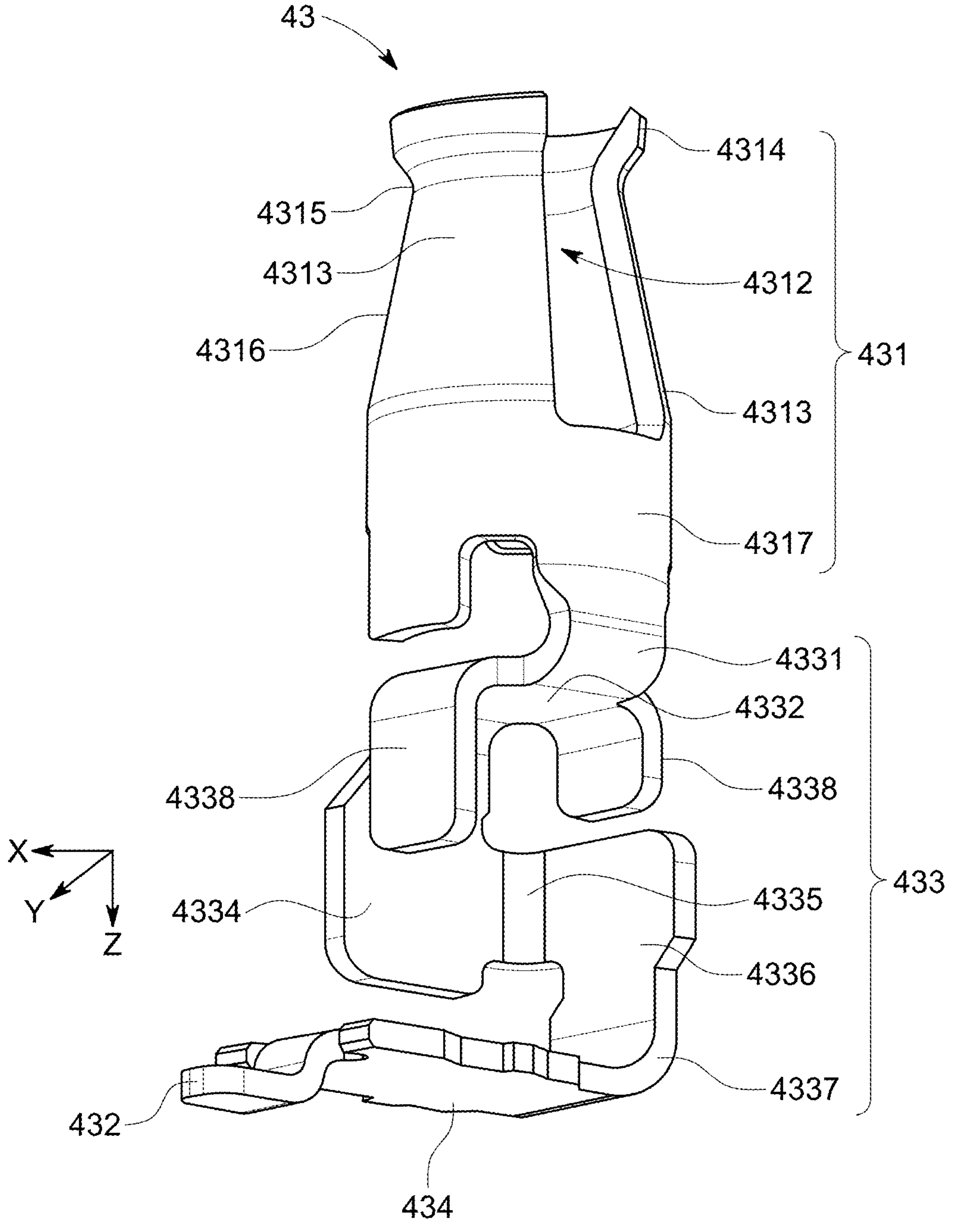
FIG. 10 is a perspective view of the floating terminal of the female connector of FIG. 5 viewed from another angle.
Figure 11:
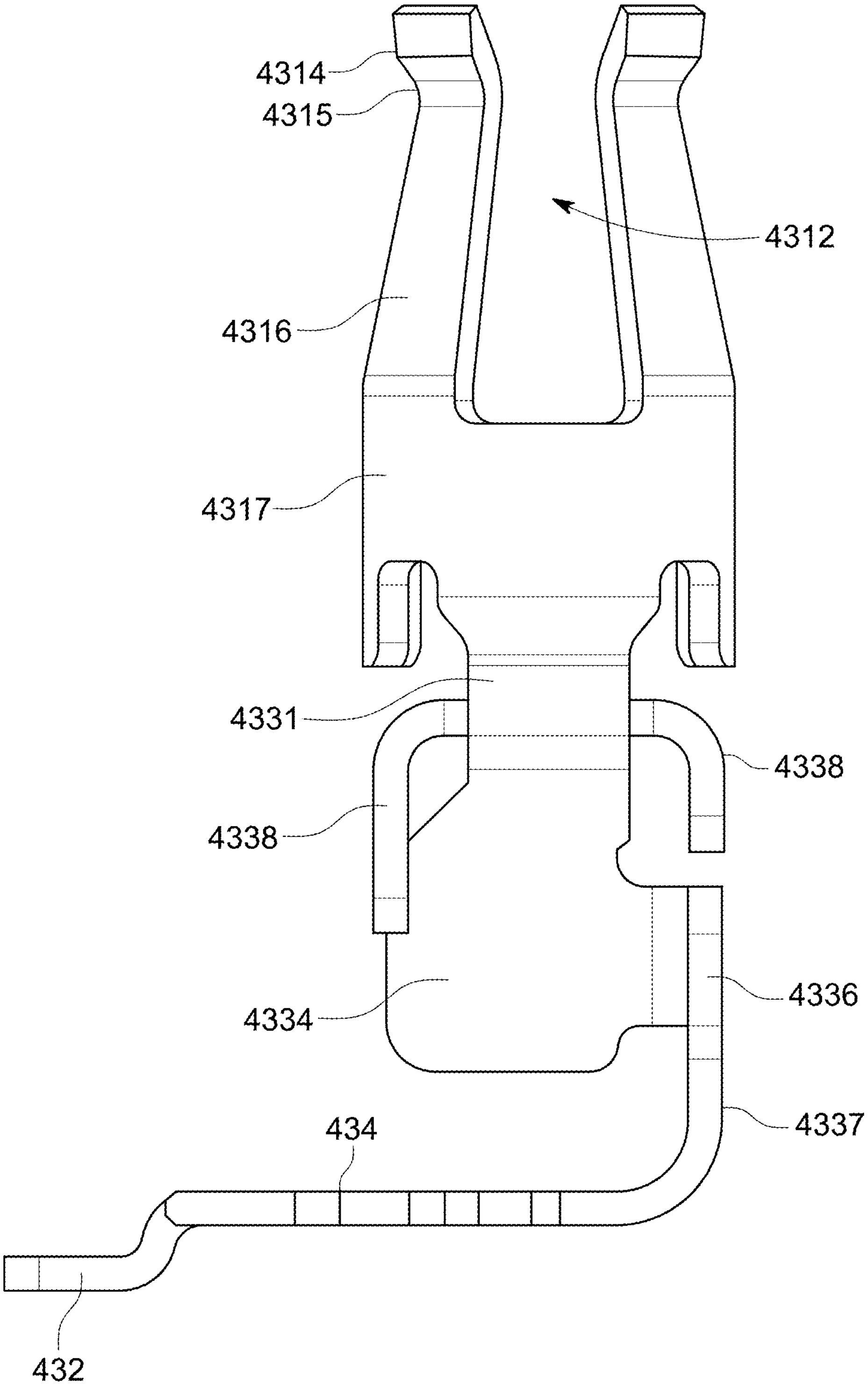
FIG. 11 is a side view of the floating terminal of FIG. 9.

Referring to FIG. 9, FIG. 10 and FIG. 11, the mating portion 431 of the floating terminal 43 includes two mating elastic pieces 4313 which face each other, the two mating elastic pieces 4313 form slits therebetween. Corresponding sides of lower portions of the two mating elastic pieces 4313 are connected with each other, upper portions of the two mating elastic pieces 4313 are separated from each other and therebetween form an inserting cavity 4318 which penetrates up and down. The inserting cavity 4318 is used to allow the central conductive member 21 of the male connector 2 to insert therein and make the central conductive member 21 of the male connector 2 and the mating portion 431 of the floating terminal 43 establish electrical connection. Horizontal cross sections of the two mating elastic piece 4313 are arcs which curve toward each other so that the two mating elastic pieces 4313 have centripetal forces which gather toward a center of the inserting cavity 4318, to ensure that a necking portion 4315 and the central conductive member 21 always maintain reliable contact therebetween. The two mating elastic pieces 4313 gather toward the center of the inserting cavity 4318 at positions of the two mating elastic pieces 431 close to upper ends of the two mating elastic pieces 431 to form the necking portion 4315 which is used to contact the central conductive member 21.

Specifically, the mating portion 431 of the floating terminal 43 has a first slit 4311 and a second slit 4312. The first slit 4311 extends from an upper end of an inserting guide portion 4314 all the way to a straight barrel portion 4317 and cuts through the straight barrel portion 4317. The second slit 4312 extends from the upper end of the inserting guide portion 4314 all the way to the straight barrel portion 4317 but does not cut through the straight barrel portion 4317. The float connecting portion 433 is connected to a lower end of the straight barrel portion 4317 and is positioned just below the second slit 4312.

The mating portion 431 entirely is a necking bottle shape. The mating portion 431 sequentially from down to up includes the straight barrel portion 4317, a cone barrel portion 4316, the necking portion 4315 and the inserting guide portion 4314. The straight barrel portion 4317 is a barrel-shaped structure which a caliber thereof is consistent up and down and which is incompletely closed, the cone barrel portion 4316 is formed by making a caliber of the cone barrel portion 4316 tapered upwardly from the straight barrel portion 4317, the inserting guide portion 4314 is formed by a caliber of the inserting guide portion 4314 slightly expanded upwardly from the cone barrel portion 4316, the necking portion 4315 is formed at a boundary position between the cone barrel portion 4316 and the inserting guide portion 4314.

Figure 14:
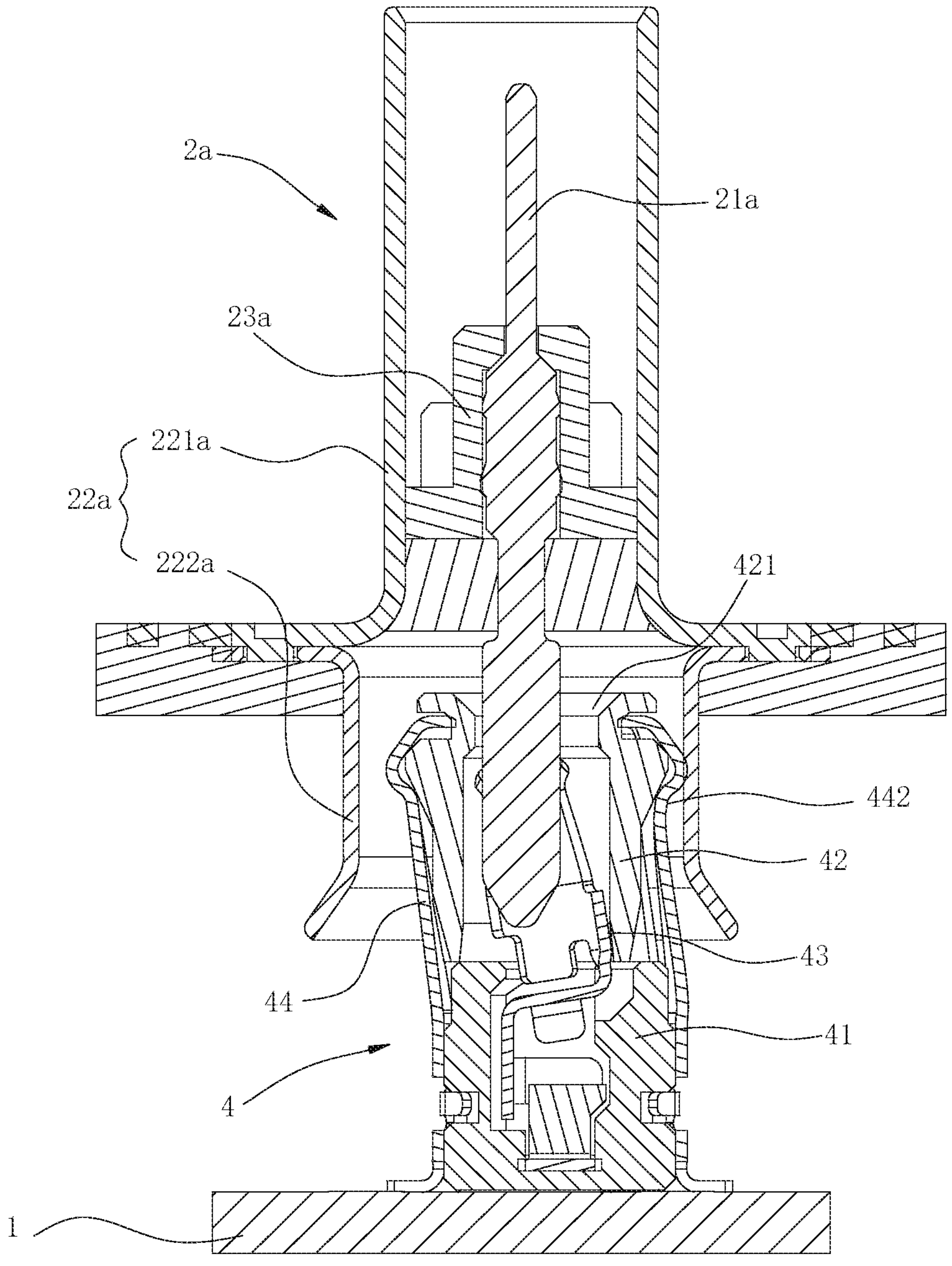
FIG. 14 is a cross sectional view of a mating state when there is assembling tolerance between the female connector of FIG. 4A and a mated male connector.

In combination with referring to FIG. 3 and FIG. 9 and FIG. 14, the inserting guide portion 4314 is substantially horn-shaped, and provides mate guiding for that the central conductive member 21 of the male connector 2 smoothly extends into the inserting cavity 4318 of the mating portion 431. When the central conductive member 21 extends into the inserting cavity 4318, the necking portion 4315 embracingly contacts an outer periphery of the central conductive member 21, the necking portion 4315 and the central conductive member 21 form two contacting bands which are arc lines in shape, a contact area between the female connector 4 and the central conductive member 21 is effectively promoted, so that the female connector 4 and the central conductive member 21 also can maintain reliable contact under a vibrating circumstance to establish a first electrical connection to transmission a signal. The metal shell 22 of the male connector 2 sheathes an outer periphery of the conductive shell 44 of the female connector 4, an elastic mating piece 442 of the conductive shell 44 elastically abuts against an inner wall of the metal shell 22 to establish a second electrical connection to provide grounding.

Referring to FIG. 9 to FIG. 11, the float connecting portion 433 is elastically connected between the mating portion 431 and the horizontal fixing portion 434. The float connecting portion 433 is formed by bending multiple times, so the float connecting portion 433 may be deformed in various directions in a three-dimensional space, so that floating of the floating terminal 43 in each direction of a left-right direction, a front-rear direction and the up-down direction may be realized.

For the sake of convenient description, the left-right direction, the front-rear direction and the up-down direction are respectively defined as an X axis direction, a Y axis direction and a Z axis direction.

The present embodiment acts as an implementing manner of the float connecting portion 433, includes three straight extending portions which sequentially bend and extend, any two straight extending portions of the three straight extending portions are perpendicular to each other. That is, the three straight extending portions respectively extend along the X axis direction, the Y axis direction and the Z axis direction of the three-dimensional space, and the three straight extending portions realize turning by respective bending portions.

Specifically, the float connecting portion 433 includes a first bending portion 4331, a first straight extending portion 4332, a second bending portion 4333, a second straight extending portion 4334, a third bending portion 4335, a third straight extending portion 4336 and a fourth bending portion 4337 which are sequentially connected.

The first bending portion 4331 is formed by bending from of a lower end of the mating portion 431 toward the X axis direction by 90 degrees, the first straight extending portion 4332 is connected with the first bending portion 4331 and is formed by extending horizontally from a horizontal tip of the first bending portion 4331 toward the X axis direction, the second bending portion 4333 is formed by bending from the first straight extending portion 4332 toward the Z axis direction by 90 degrees, the second straight extending portion 4334 is connected with the second bending portion 4333 and is formed by vertically extending downwardly from a lower end of the second bending portion 4333 toward the Z axis direction, the third bending portion 4335 is formed by bending from the second straight extending portion 4334 along a horizontal direction by 90 degrees, the third straight extending portion 4336 is connected with the third bending portion 4335 and is formed by extending vertically from the third bending portion 4335 toward a direction perpendicular to the second straight extending portion 4334, the fourth bending portion 4337 is formed by bending from the third straight extending portion 4336 toward the Y axis direction by 90 degrees, the horizontal fixing portion 434 is connected with the fourth bending portion 4337 and is formed by extending from a horizontal tip of the fourth bending portion 4337 toward the Y axis direction (a horizontal direction).

The three straight extending portions and the four bending portions of the float connecting portion 433 form flexible connections therebetween, so that the float connecting portion 433 and the mating portion 431 are capable of floating relative to each other and the float connecting portion 433 and the horizontal fixing portion 434 are capable of floating relative to each other, and the three straight extending portions of the float connecting portion 433 which respectively extend toward various directions of the three-dimensional space also are capable of floating relative to each other, so that the floating terminal 43 floats in the various directions in the three-dimensional space is realized.

Figure 13A:
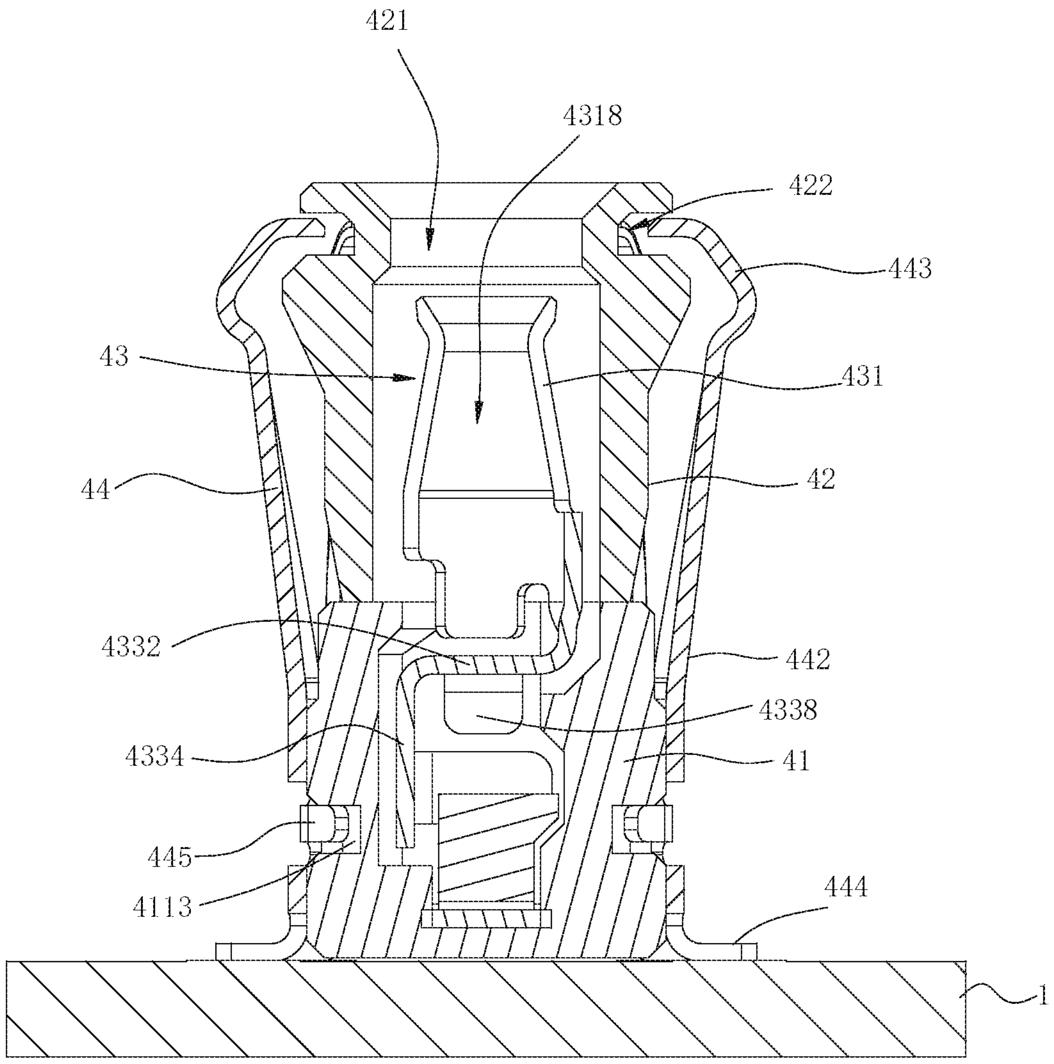
FIG. 13A is a cross sectional view taken along a line B-B of FIG. 4B.

Referring to FIG. 13A to FIG. 14, the float connecting portion 433 is received in the terminal receiving groove 41$a$ of the main fixing seat 411, the terminal receiving groove 41$a$ and the float connecting portion 433 have a gap therebetween, so as to make the float connecting portion 433 has a floating space.

The terminal receiving groove 41$a$ has spacing members which extend into between various portions of the float connecting portion 433. The spacing member is capable of functioning as limiting of elastic deformation of the respective portion of the float connecting portion 433, avoiding the floating extent of the floating terminal 43 in the terminal receiving groove 41$a$ being too large to affect mating stability between the floating terminal 43 and the male connector 2.

Referring to FIG. 11, specifically, in the present embodiment, two opposite sides of the first straight extending portion 4332 each have a bending arm 4338 which extends downwardly, the bending arm 4338 has a free end which is suspended. The two bending arms 4338 which face each other may promote a capacitive reactance of the floating terminal 43 so as to realize impedance matching, further may cooperate with the auxiliary fixing seat 412 to realize function of auxiliary fixing.

Again referring to FIG. 7 and FIG. 13B, the auxiliary fixing seat 412 is provided with the spacing block 4121. The spacing block 4121 is interposed between the bending arm 4338 of the floating terminal 43 and the horizontal fixing portion 434 of the floating terminal 43 to realize auxiliary fixing of the floating terminal 43, at the same time, the spacing block 4121 also is capable of functioning as position-limiting on the elastic deformation of the floating terminal 43 by a certain extent, avoiding the floating terminal 43 floating excessively to affect mating stability between the floating terminal 43 and the male connector 2.

Again referring to FIG. 6, the first position-limiting wall 413 of the main fixing seat 411 is further provided with the stopping wall 4111 which protrudes. The stopping wall 4111 stops below the first bending portion 4331 of the floating terminal 43 to limit excessive floating of the first bending portion 4331.

Figure 12:
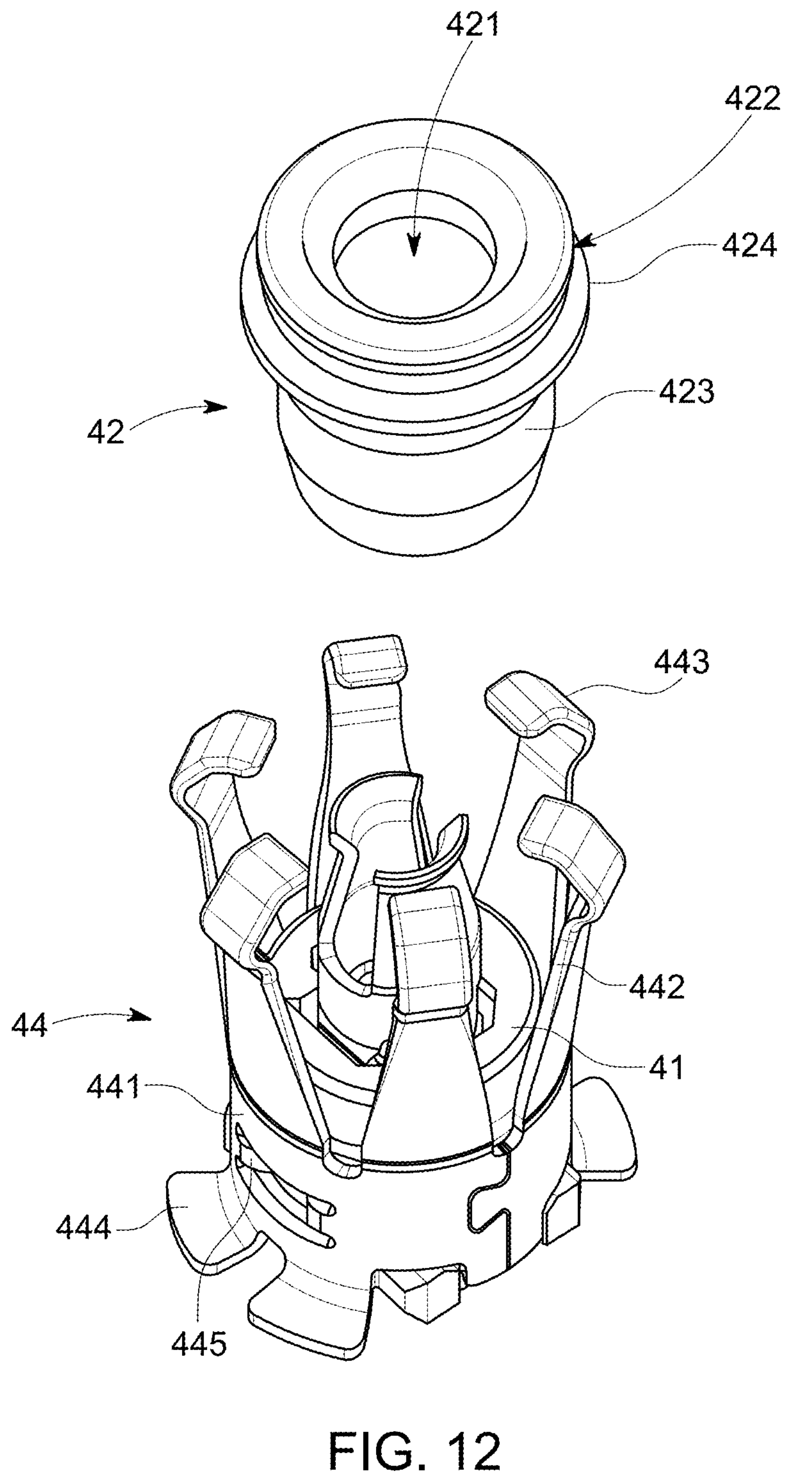
FIG. 12 is a perspective exploded view of the insulative floating seat and a conductive shell of the female connector of FIG. 5.
Figure 13B:
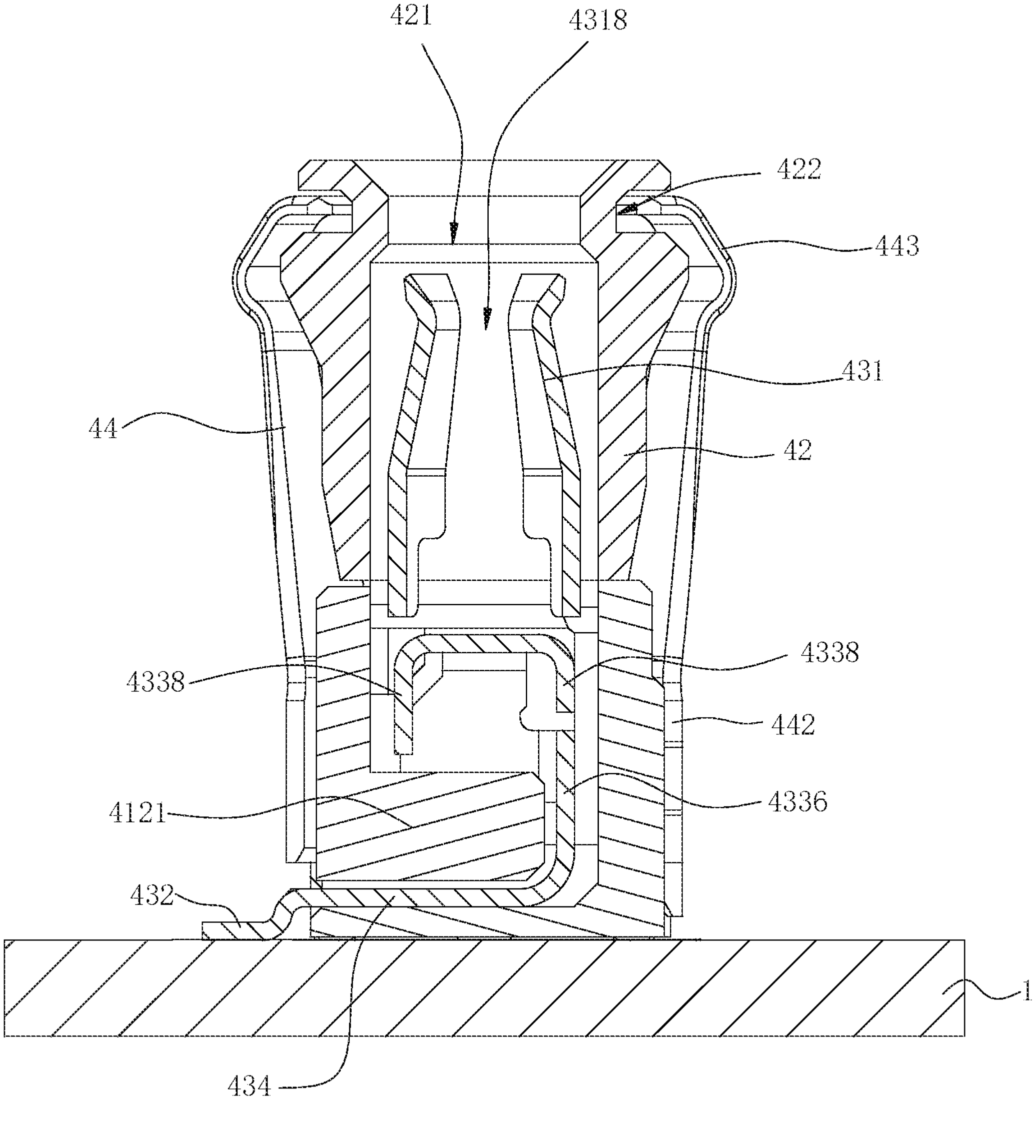
FIG. 13B is a cross sectional view taken along a line C-C of FIG. 4B.

Referring to FIG. 12, FIGS. 13A and 13B, the conductive shell 44 is a conductive material, and sheathes the insulative fixing seat 41 and the insulative floating seat 42. The conductive shell 44 includes a sleeve portion 441 which is an annular shape and a plurality of elastic mating pieces 442 which extend upwardly from the sleeve portion 441. The sleeve portion 441 sheathes the insulative fixing seat 41, a lower end of the sleeve portion 441 is provided with a plurality of soldering legs 444 which extend outwardly. The soldering leg 444 is used to fix the conductive shell 44 and the circuit board 1 by soldering.

The sleeve portion 441 is provided with at least one latch 445 which protrudes inwardly, when the conductive shell 44 sheathes the insulative fixing seat 41, the latch 445 of the sleeve portion 441 may extend into the recessed groove 4113 (as shown in FIG. 7) of the insulative fixing seat 41 by stamping, so as to realize relative fixing between the sleeve portion 441 and the insulative fixing seat 41.

A tip of each elastic mating piece 442 extends into and is received in the annular groove 422 of the insulative floating seat 42. Specifically, the plurality of elastic mating pieces 442 are distributed to be spaced apart from each other around along an upper end of the sleeve portion 441 and form a cage shape. An upper end of the elastic mating piece 442 bends toward a central axis of the conductive shell 44 to form a bending hook 443. The bending hook 443 is suspended and latches with the protruding ring 424 of the insulative floating seat 42, a tip of the bending hook 443 extends into the annular groove 422 and has a gap with the annular groove 422, so as to prevent the insulative floating seat 42 from being detached from the insulative fixing seat 41 and permit the insulative floating seat 42 to float in a horizontal direction and the up-down direction by a narrow extent. The protruding ring 424 is capable of functioning as position-limiting on the bending hook 443 to avoid the bending hook 443 being detached from the annular groove 422.

Because the elastic mating piece 442 has elasticity, the elastic mating piece 442 may be appropriately deformed so that the insulative floating seat 42 may float relative to the insulative fixing seat 41, and in a floating process of the insulative floating seat 42, the elastic mating piece 442 also can appropriately constrain the insulative floating seat 42 to ensure that the insulative floating seat 42 is not detached from the insulative fixing seat 41.

Referring to FIG. 3 and FIG. 14 for comparison, FIG. 3 is a cross sectional view of the electrical connector assembly 100 of the present disclosure, and illustrates a mating state between the female connector 4 of the first embodiment and the male connector 2 (there is not a mating tolerance); FIG. 14 illustrates a mating state between the female connector 4 of the first embodiment and a male connector 2$a$ (there is a mating tolerance).

The male connector 2 of FIG. 3 has been presented in the above description, so the repeated description is omitted, the male connector 2*a* of FIG. 14 is slightly different from the male connector 2 of FIG. 3. The male connector 2*a* of FIG. 14 includes: a central conductive member 21*a*, an insulative seat 23*a* which allows the central conductive member 21*a* to be mounted thereon, and a metal shell 22*a*. The metal shell 22*a* includes a first metal shell 221*a* and a second metal shell 222*a* which mate with and are connected with each other, the first metal shell 221*a* and the second metal shell 222*a* form a mounting passageway which penetrates the metal shell 22*a*, the central conductive member 21*a* and the insulative seat 23 are received in the mounting passageway.

Referring to FIG. 3, when the female connector 4 and the male connector 2 mate with each other, the female connector 4 is received the main mounting housing 3, the male connector 2 inserts into the mating post 31 of the main mounting housing 3, the central conductive member 21 of the male connector 2 inserts into the mating portion 431 of an upper end of the floating terminal 43 of the female connector 4, and the central conductive member 21 is clamped by the two mating elastic pieces 4313 of the mating portion 431 to realize electrical connection between the floating terminal 43 and the central conductive member 21, the conductive shell 44 of the female connector 4 extends into the metal shell 22 of the male connector 2, and the conductive shell 44 of the female connector 4 contacts the inner wall of the metal shell 22 to realize electrical connection between the conductive shell 44 and the metal shell 22, in the male connector 2 and the female connector 4, electrical signal transmission is realized by conduction between the central conductive member 21 and the floating terminal 43, signal shield is realized by conduction between the metal shell 22 and the conductive shell 44 to filter a noise.

Referring to FIG. 14, when there is assembling tolerance between the female connector 4 and the male connector 2*a*, axial misalignment between the male connector 2*a* and the female connector 4 occurs, at this time, the central conductive member 21*a* of the male connector 2*a* is still capable of aligning with an edge of the mating portion 431 of the female connector 4, by using a horn-shaped opening of the inserting guide portion 4314 of an upper end of the mating portion 431 to guide the central conductive member 21*a*, the central conductive member 21*a* smoothly inserts into the mating portion 431, and at the same time, the floating terminal 43, the insulative floating seat 42 and the elastic mating piece 442 of the conductive shell 44 of the female connector 4 also complies with the central conductive member 21*a* to skew, and after skewing, the mating portion 431 is still capable of maintaining reliable mating with the central conductive member 21*a*, the conductive shell 44 also still capable of maintaining reliable mating with the second the metal shell 222*a* of the male connector 2*a*. Even under a vibrating circumstance, the floating terminal 43 also can comply with vibrating to be deformed in the various directions, such as the left-right direction, the front-rear direction and the up-down direction, and after deformed, the floating terminal 43 still maintains reliable mating with the male connector 2*a*, so that stability of signal transmission is assured, and, when the floating terminal 43 floats, the insulative floating seat 42 also may comply with the floating terminal 43 to float compliantly, which is beneficial to an omni-direction floating of the floating terminal 43, at the same time is also beneficial to maintain the state of the floating terminal 43 after deformed, and make the floating terminal 43 better adapted to the assembling tolerance and maintain normal operation under the vibrating circumstance.

Figure 15:
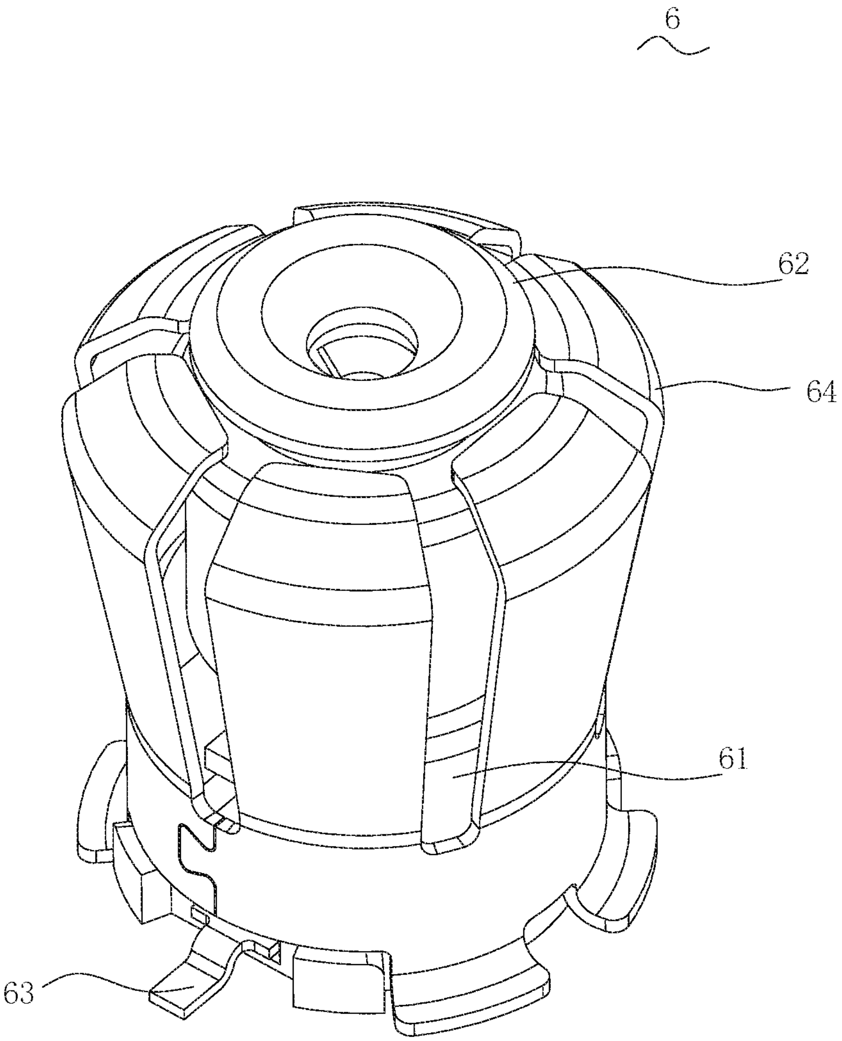
FIG. 15 is a perspective view of a female connector of a second preferred embodiment.
Figure 16:
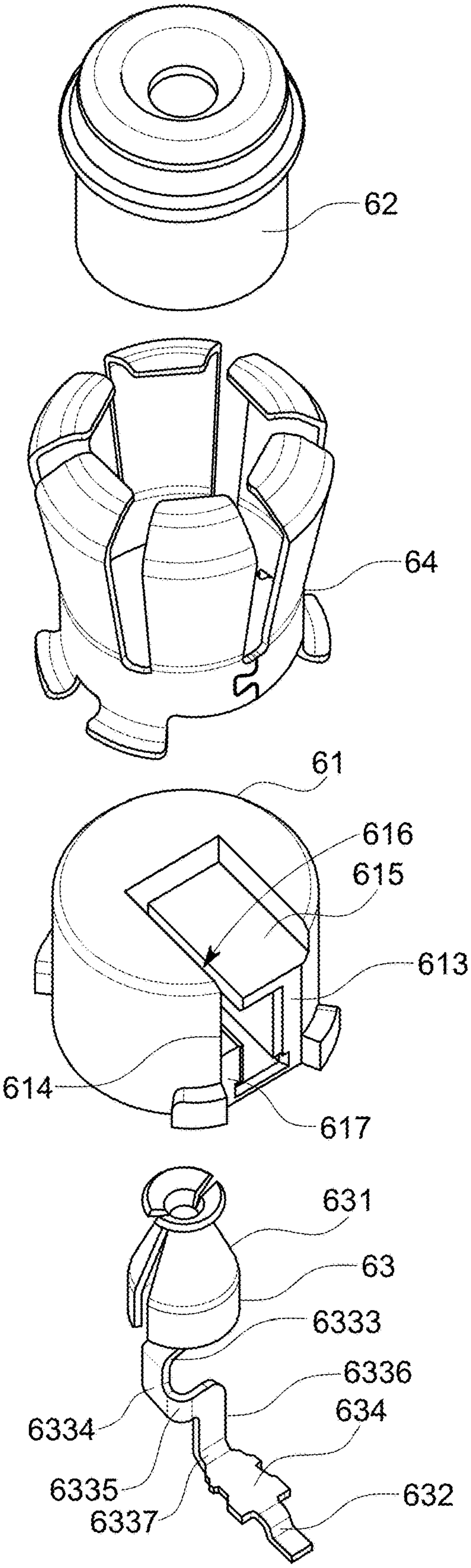
FIG. 16 is an exploded view of the female connector of FIG. 15.

Referring to FIG. 15 and FIG. 16, a female connector 6 of a second embodiment of the present disclosure includes an insulative fixing seat 61, an insulative floating seat 62, a floating terminal 63 and a conductive shell 64. Here, the insulative floating seat 62 and the conductive shell 64 are similar to the structures of the female connector 4 of the first embodiment, so repeated description is omitted herein.

Specifically, in the second embodiment, the floating terminal 63 also includes s a mating portion 631, a float connecting portion 633, a horizontal fixing portion 634 and a soldering tail portion 632 which are sequentially connected.

Specific structures of the mating portion 631 and the soldering tail portion 632 of the floating terminal 63 are the same as the structures of the female connector 4 of the mating portion 431 of the first embodiment, so repeated description is omitted herein.

An extending direction of the horizontal fixing portion 634 of the floating terminal 63 is different from that of the female connector 4 of the first embodiment, in the first embodiment, the horizontal fixing portion 634 extends horizontally just below the mating portion 631, but in the second embodiment, the horizontal fixing portion 634 extends horizontally offset just below the mating portion 631.

Figure 17:
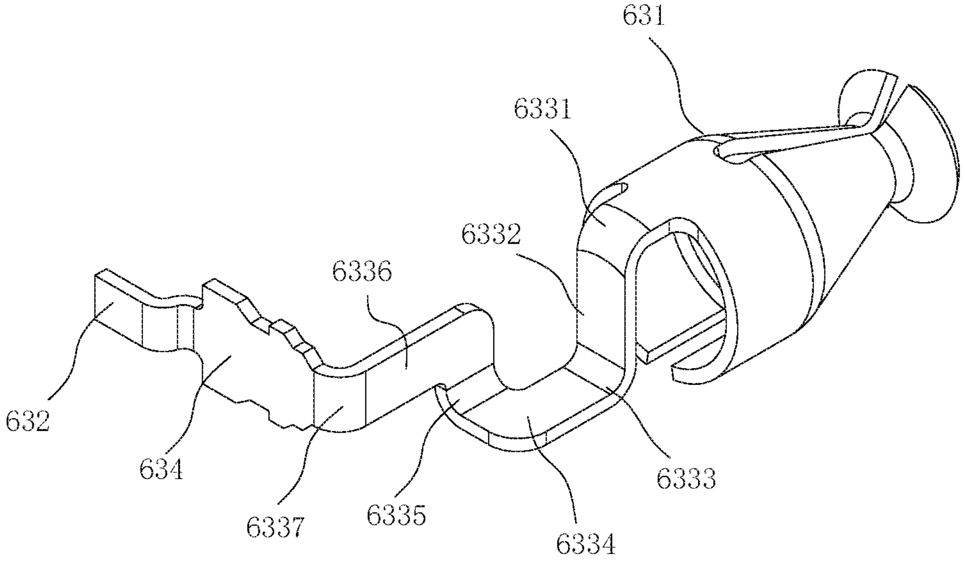
FIG. 17 is a perspective view of a floating terminal of the female connector of FIG. 16.
Figure 18:
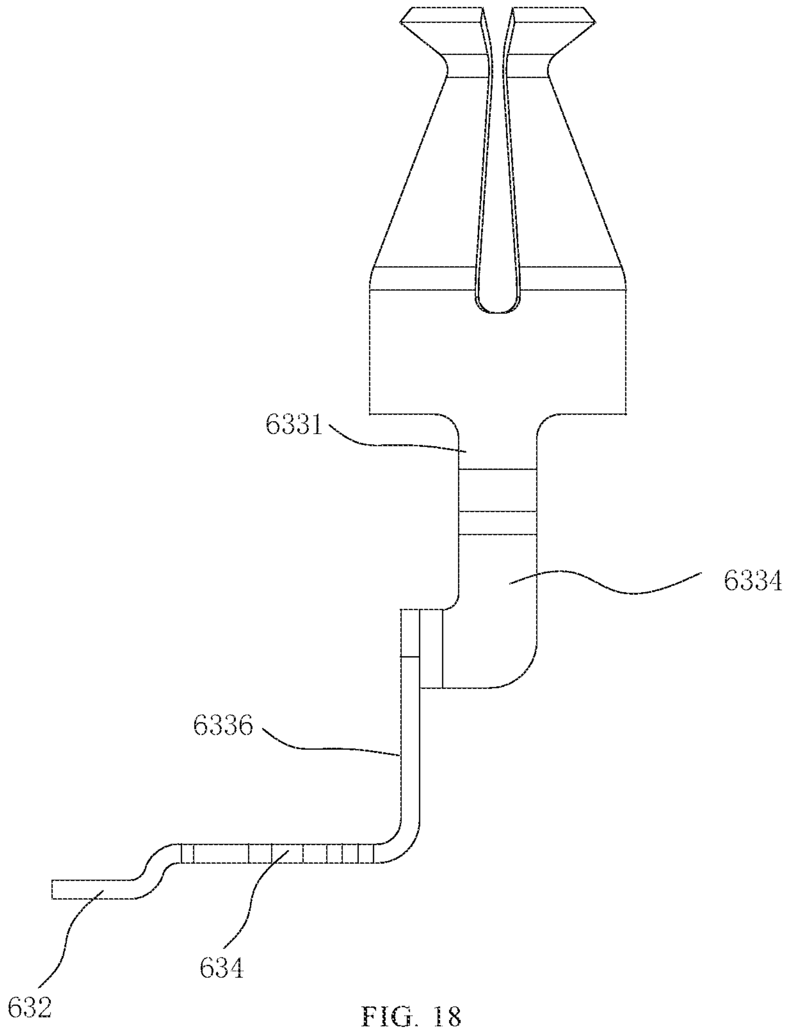
FIG. 18 is a side view of the floating terminal of FIG. 16.

Referring to FIG. 17 and FIG. 18, the float connecting portion 633 of the floating terminal 63 includes three straight extending portions which sequentially bend and extend, any two straight extending portions of the three straight extending portions are perpendicular to each other. And the three straight extending portions realize turning by respective bending portions.

Specifically, the float connecting portion 633 includes a first bending portion 6331, a first straight extending portion 6332, a second bending portion 6333, a second straight extending portion 6334, a third bending portion 6335, a third straight extending portion 6336 and a fourth bending portion 6337 which are sequentially connected.

The first bending portion 6331 is formed by bending from a lower end of the mating portion 631 toward a horizontal direction by 90 degrees, the first straight extending portion 6332 is connected with the first bending portion 6331 and is formed by extending horizontally from a horizontal tip of the first bending portion 6331, the second bending portion 6333 is formed by bending downwardly from the first straight extending portion 6332, the second straight extending portion 6334 is connected with the second bending portion 6333 and is formed by vertically extending downwardly from the second bending portion 6333, the third bending portion 6335 is formed by bending from the second straight extending portion 6334 along the horizontal direction by 90 degrees, the third straight extending portion 6336 is connected with the third bending portion 6335 and is formed by vertically extending downwardly from the third bending portion 6335, the fourth bending portion 6337 is formed by bending from the third straight extending portion 6336 toward a horizontal direction, the horizontal fixing portion 634 is connected with the fourth bending portion 6337 and is formed by extending from the fourth bending portion 6337 toward the horizontal direction.

The first straight extending portion 6332, the second straight extending portion 6334 and the third straight extending portion 6336 of the female connector 6 of the second embodiment sequentially lower in height from up to down, the three straight extending portions and the four bending portions form flexible connections therebetween, so that the float connecting portion 633 and the mating portion 631 are capable of floating relative to each other and the float connecting portion 633 and the horizontal fixing portion 634 are capable of floating relative to each other, and the three straight extending portions of the float connecting portion 633 which respectively extend toward various directions of the three-dimensional space are capable of being deformed in an up-down direction, a left-right direction, a front-rear direction of the three-dimensional space, so that the floating terminal 63 float in the various directions in three-dimensional space is realized.

Figure 19:
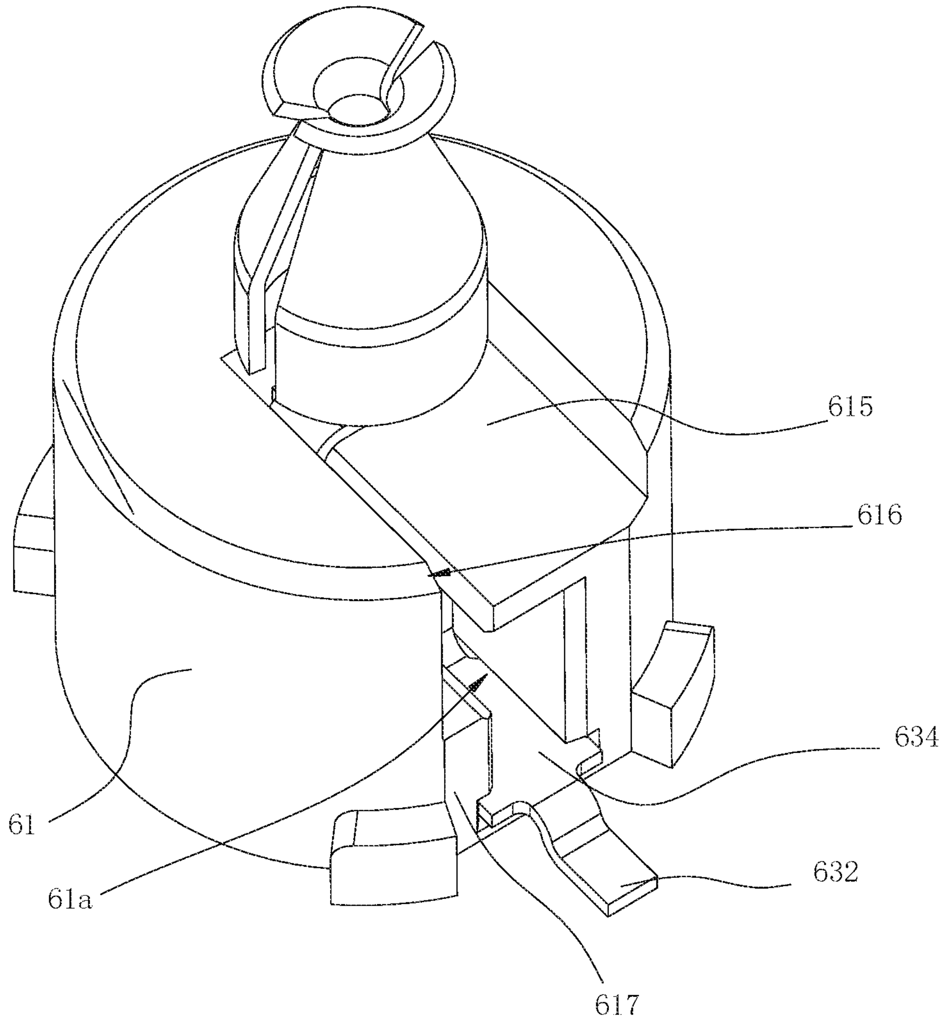
FIG. 19 is a perspective view of the floating terminal of the female connector of FIG. 16 assembled to an insulative fixing seat.
Figure 20:
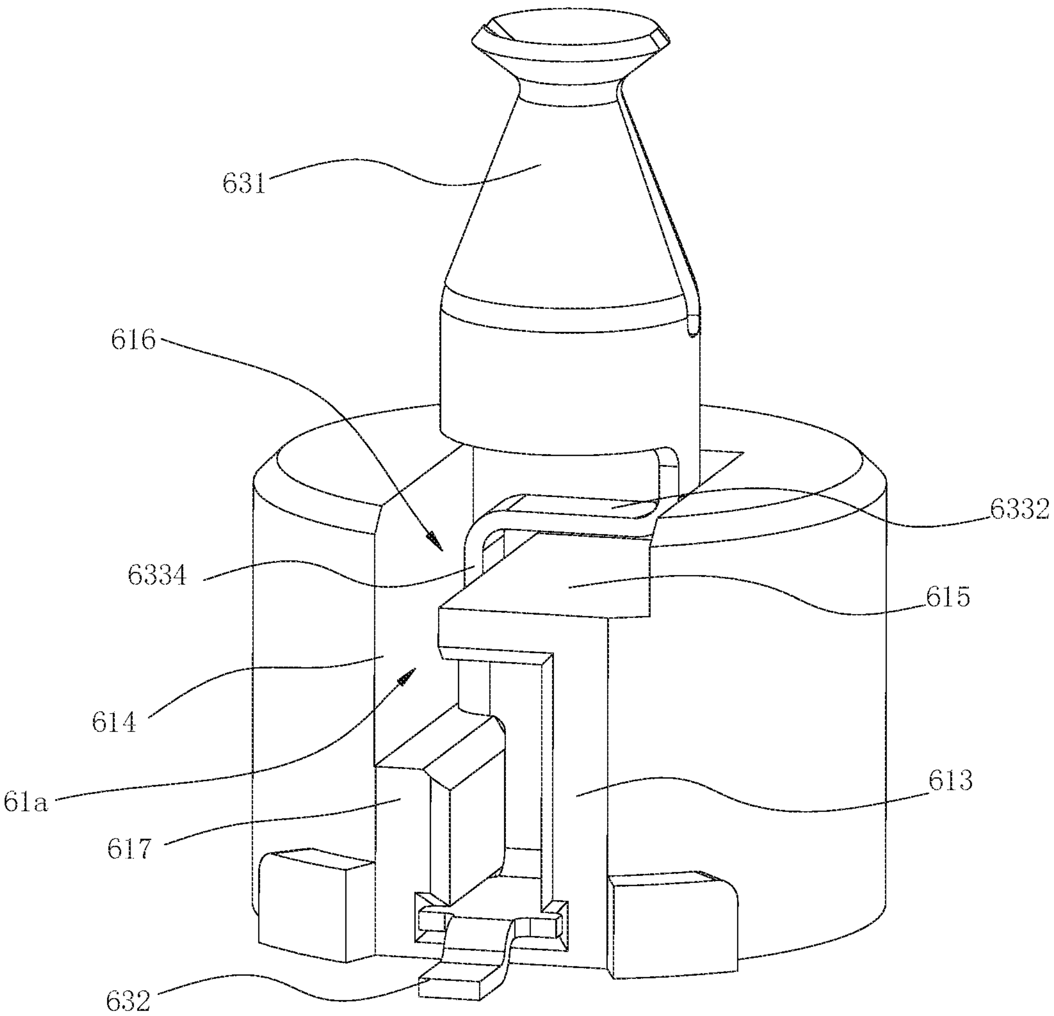
FIG. 20 is a perspective view of the floating terminal and the insulative fixing seat of the female connector of FIG. 16 after assembled viewed from another angle.
Figure 21:
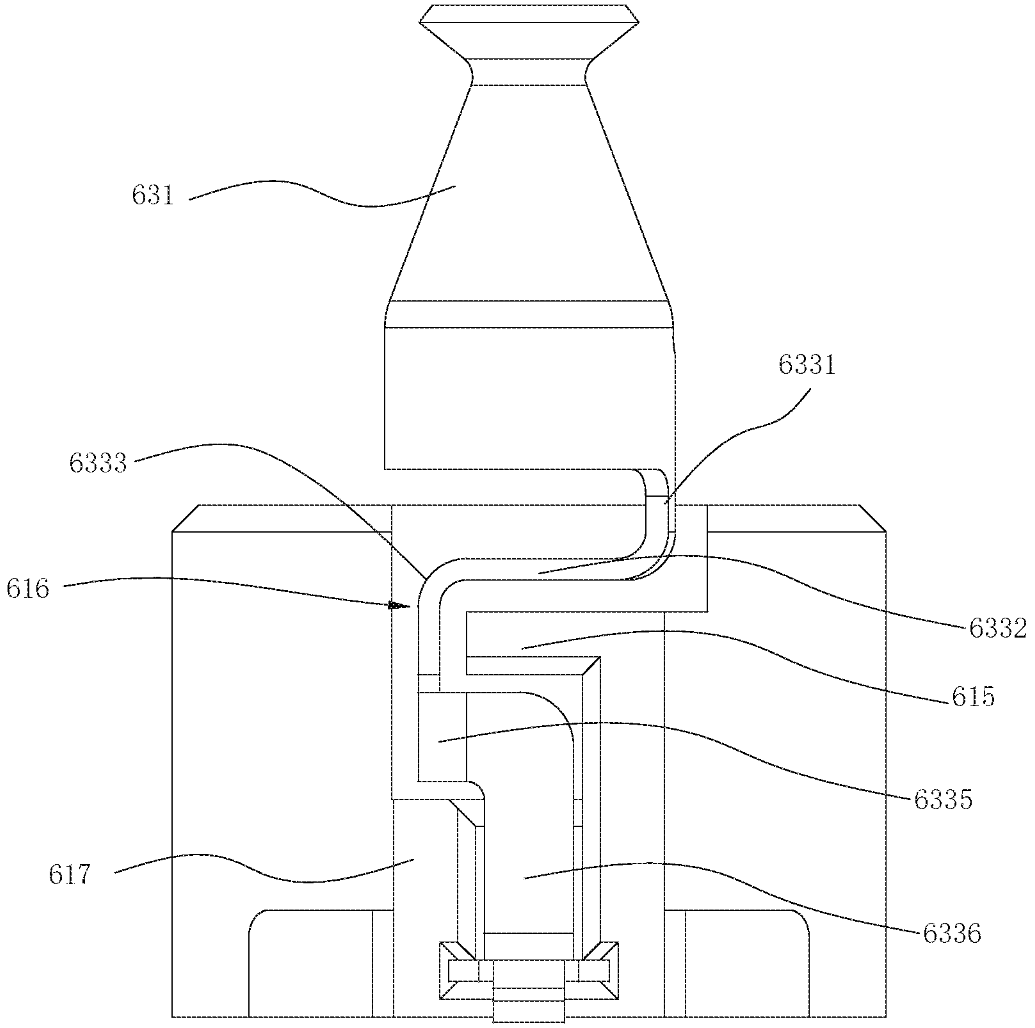
FIG. 21 is a side view of the floating terminal and the insulative fixing seat of FIG. 20 after assembled.

Referring to FIG. 19 to FIG. 21, an insulative fixing seat 61 of the female connector 6 of the second embodiment also has a terminal receiving groove 61*a* which is used to receive the floating terminal 63, the terminal receiving groove 61*a* partitions an inner wall of the insulative fixing seat 61 into a first position-limiting wall 613 and a second position-limiting wall 614. The terminal receiving groove 61*a* forms an opening which is opened at a side surface of the insulative fixing seat 61, the floating terminal 63 is mounted in the insulative fixing seat 61 via the opening.

The first position-limiting wall 613 of the insulative fixing seat 61 is provided with a partitioning wall 615 at a position of the first position-limiting wall 613 which is close to a top portion of the first position-limiting wall 613, the partitioning wall 615 is formed by extending horizontally toward the second position-limiting wall 614, the partitioning wall 615 and the second position-limiting wall 614 have a gap 616 therebetween. The partitioning wall 615 extends into below the first straight extending portion 6332 of the floating terminal 63, the partitioning wall 615 and the first straight extending portion 6332 have an interval therebetween so that the first straight extending portion 6332 is capable of floating up and down, but at the same time the partitioning wall 615 also constitutes position-limiting on floating of the first straight extending portion 6332, prevents the first straight extending portion 6332 from excessively floating to affect stability of mating with the male connector.

The second straight extending portion 6334 inserts into the gap 616 between the partitioning wall 615 and the second position-limiting wall 614, and is capable of floating in the gap 616, at the same time, the partitioning wall 615 and the second position-limiting wall 614 also constitute position-limiting on horizontal floating of the second straight extending portion 6334, prevent the second straight extending portion 6334 from excessively floating along the horizontal direction.

The second position-limiting wall 614 is provided with a stopping portion 617 which protrudes. The stopping portion 617 stops below the second straight extending portion 6334, prevents the second straight extending portion 6334 from excessively floating downwardly.

Figure 22:
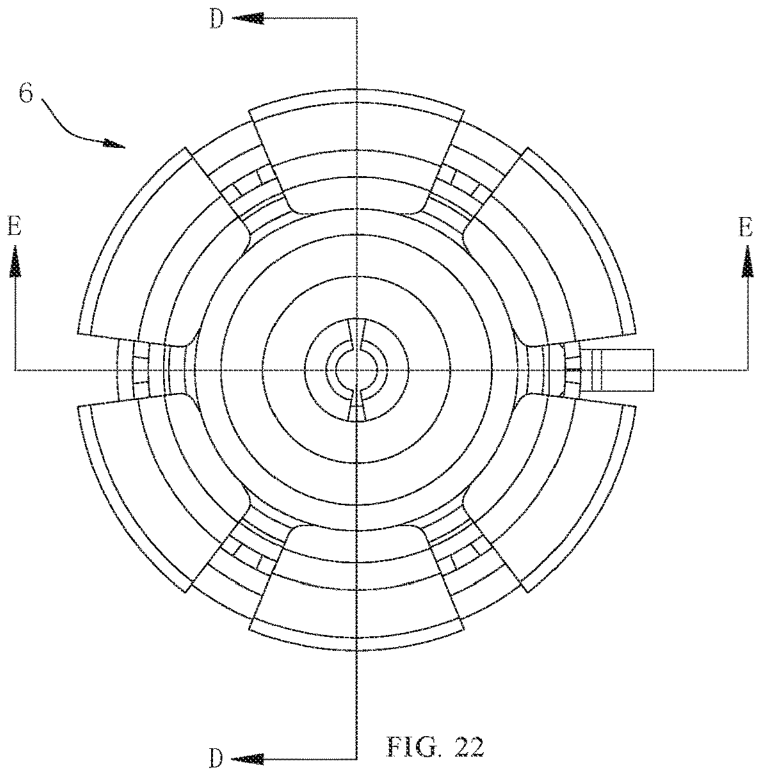
FIG. 22 is a top view of the female connector of FIG. 15.
Figure 23:
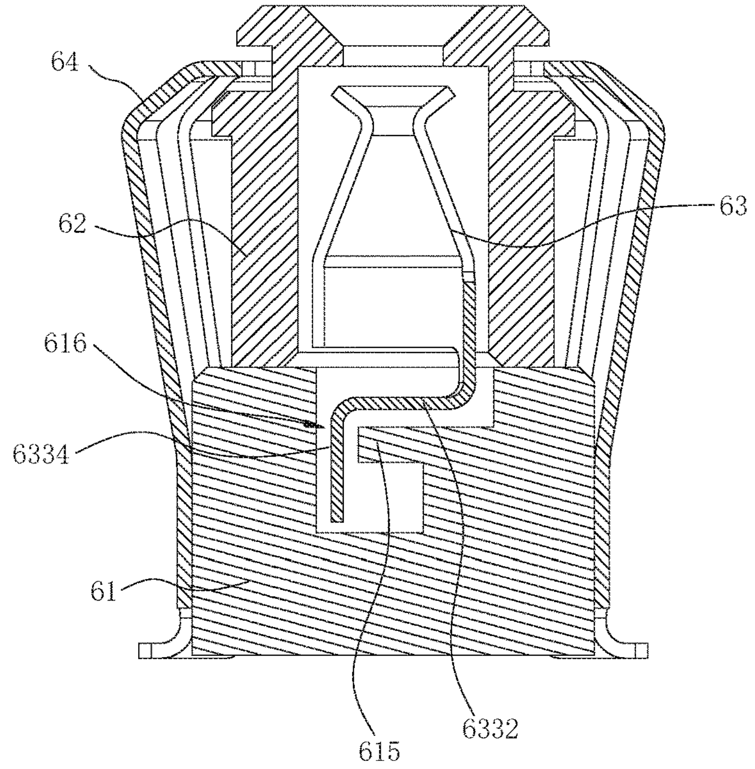
FIG. 23 is a cross sectional view taken along a line D-D of FIG. 22.
Figure 24:
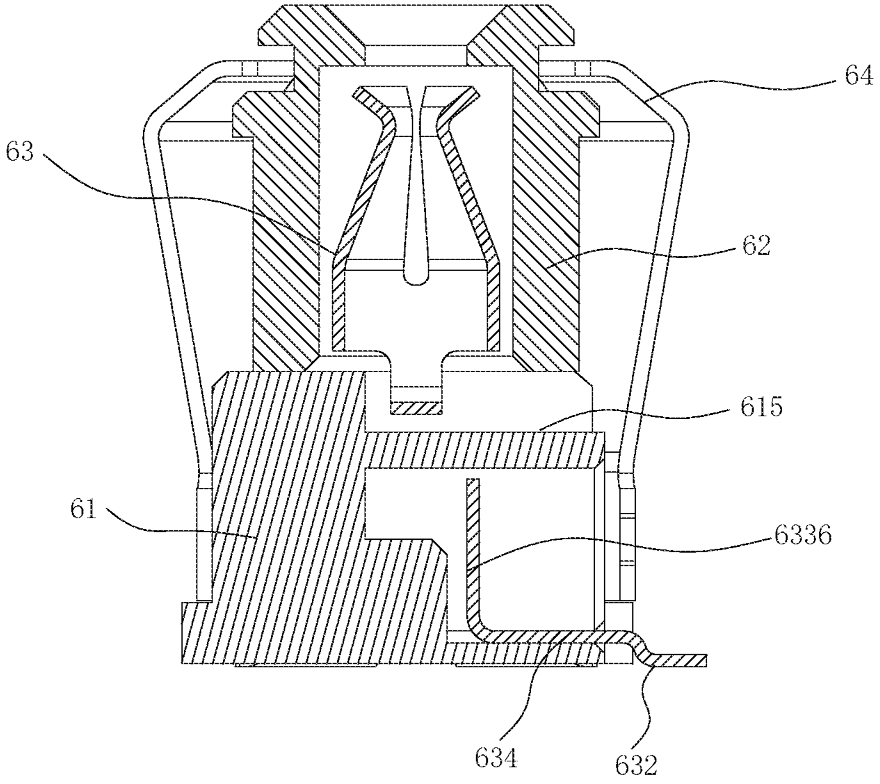
FIG. 24 is a cross sectional view taken along a line E-E of FIG. 22.

Referring to FIG. 22 to FIG. 24, when the female connector 6 of the second embodiment is assembled, the insulative floating seat 62 may be floatingly provided above the insulative fixing seat 61, the float connecting portion 633 and the horizontal fixing portion 634 of the floating terminal 63 are received in the insulative fixing seat 61, the soldering tail portion 632 is exposed outside the insulative fixing seat 61, the mating portion 631 upwardly extends into the insulative floating seat 62, the conductive shell 64 sheathes the insulative fixing seat 61 and the insulative floating seat 62 to prevent the insulative floating seat 62 from being detached from the insulative fixing seat 61.

Because the floating terminal 63 of the female connector 6 of the second embodiment also includes the three straight extending portions which respectively extend along the various direction of the three-dimensional space, the floating terminal 63 also is capable of being deformed in the various directions of the three-dimensional space, in turn that the floating terminal 63 floats in the various directions of the three-dimensional space is realized, and when the floating terminal 63 floats, the insulative floating seat 62 also may compliantly float under elastic constraint of the mating elastic piece of the conductive shell 64 to comply with the floating terminal 63, so as to ensure that the floating terminal 63 floats in the up-down direction, the left-right direction and the front-rear direction, and make the floating terminal 63 better adapted to assembling tolerance between the floating terminal 63 and an electrical connector mated with the floating terminal 63 and maintain normal operation under the vibrating circumstance.

Moreover, it is noted as follows.

The mating portion and the horizontal fixing portion of the floating terminal of the above each embodiment are connected via the float connecting portion. The float connecting portion is connected by the three straight extending portions which respectively extend along the different directions of the three-dimensional space and the bending portions, so that that the float connecting portion is deformed in the various directions of the three-dimensional space is realized, in turn omni-direction floating of the floating terminal in the up-down direction, the left-right direction and the front-rear direction is realized. The connecting relationships between the bending portions with the straight extending portions and the bending directions are only taken as an example for description and are not used as limiting herein.

In other embodiment, the bending directions of the bending portions and the extending directions of the straight extending portions may be changed by substitutions.

In other embodiments, the shape of the float connecting portion also may be not limited to a combined form of the straight extending portions and the bending portions, the float connecting portion further may be a wave line shape which bends multiple times, or a spring shape with spiral coil, or a double helix shape which bends similar to DNA structure, these shapes are capable of making the float connecting portion deformed in the three-dimensional direction of the space.

The main fixing seat and the auxiliary fixing seat snap with and are connected with each other in the above each embodiment, but in other embodiments, the main fixing seat and the auxiliary fixing seat also may be connected by other manners, for example, adhering, or, the main fixing seat and the auxiliary fixing seat also may be an integral structure.

The above each embodiment of the electrical connector is only taken as an example for description, the structures of various parts of the electrical connector assembly are not the combined structures which fixedly cooperate with each other, in the case that there is no confliction in structure, the structure of various parts of the embodiments of the electrical connector may be arbitrarily combined and used.

What is described above is just the preferred embodiments of the present disclosure, which is not intended to limit the implementing solutions of the present disclosure, ordinary technical personnel in the field can conveniently make corresponding changes or modifications according to the main concept and spirit of the present disclosure, so the protection scope of the present disclosure should be based on the protection scope claimed by the claims.

What is claimed is:

1. An electrical connector comprising:

an insulative fixing seat which has a terminal receiving groove therein, a bottom portion of the terminal receiving groove having a terminal fixing groove which extends horizontally;

an insulative floating seat floatingly mounted above the insulative fixing seat, the insulative floating seat having an insertion hole which penetrates up and down, and an outer wall of the insulative floating seat being provided with an annular groove;

a floating terminal comprising a soldering tail portion, a horizontal fixing portion which is connected with the soldering tail portion and extends horizontally, a mating portion and a float connecting portion which is elastically connected between the mating portion and the horizontal fixing portion, the horizontal fixing portion being fixed to the insulative fixing seat in the terminal fixing groove, the float connecting portion being floatingly received in the terminal receiving groove, the mating portion upwardly extending into the insertion hole of the insulative floating seat, and the soldering tail portion extending outwardly from an outer side of the insulative fixing seat; and a conductive shell which partially sheathes the outer side of the insulative fixing seat, the conductive shell having a plurality of elastic mating pieces which extend upwardly, and a tip of each elastic mating piece extending into the annular groove and engaging with the insulative floating seat to prevent the insulative floating seat from being detached from the insulative fixing seat while allowing the insulative floating seat to move relative to the insulative fixing seat.

2. The electrical connector of claim 1, wherein the float connecting portion of the floating terminal comprises three straight extending portions which sequentially bend and extend from other portions of the floating terminal, any two straight extending portions of the three straight extending portions are perpendicular to each other.

3. The electrical connector of claim 1, wherein the float connecting portion comprises:

a first bending portion connected with the mating portion, a first straight extending portion connected with the first bending portion and extending horizontally, a second bending portion bending downwardly from the first straight extending portion by 90 degrees, a second straight extending portion connected with the second bending portion and extending vertically, a third bending portion bending horizontally from the second straight extending portion by 90 degrees, a third straight extending portion connected with the third bending portion and extending vertically, and a fourth bending portion connected with the third straight extending portion; and the horizontal fixing portion is connected with the fourth bending portion.

4. The electrical connector of claim 3, wherein two opposite sides of the first straight extending portion each have a bending arm which extends downwardly, the bending arm has a free end which is suspended.

5. The electrical connector of claim 3, wherein the horizontal fixing portion of the floating terminal extends horizontally just below the mating portion; or the horizontal fixing portion of the floating terminal extends horizontally offset just below the mating portion.

6. The electrical connector of claim 3, wherein the terminal receiving groove is provided at a side of the insulative fixing seat and partitions the insulative fixing seat into a first position-limiting wall and a second position-limiting wall which face each other, the first position-limiting wall is provided with a partitioning wall which extends horizontally toward the second position-limiting wall, the partitioning wall and the second position-limiting wall have a gap therebetween, the partitioning wall extends into below the first straight extending portion, the partitioning wall and the first straight extending portion has an interval therebetween, and the second straight extending portion inserts into the gap and is configured to float in the gap.

7. The electrical connector of claim 6, wherein the first position-limiting wall and the second position-limiting wall are respectively provided with a first inserting groove and a second inserting groove respectively at a position which is close to a bottom end of the first position-limiting wall and a position which is close to a bottom end of the second position-limiting wall, an opening of the first inserting groove and an opening of the second inserting groove face each other and together form the terminal fixing groove, and two sides of the horizontal fixing portion of the floating terminal are respectively snapped in the first inserting groove and the second inserting groove.

8. The electrical connector of claim 1, wherein the mating portion of the floating terminal comprises two mating elastic pieces which are provided to face each other, cross sections of the two mating elastic pieces are arcs which curve toward each other, corresponding sides of lower portions of the two mating elastic pieces are connected, upper portions of the two mating elastic pieces are separated from each other, and the two mating elastic pieces therebetween form an inserting cavity which penetrates up and down, the two mating elastic pieces gather toward a center of the inserting cavity at positions of the two mating elastic pieces close to upper ends of the two mating elastic pieces to form a necking portion.

9. The electrical connector of claim 8, wherein the mating portion sequentially from down to up comprises:

a straight barrel portion, a cone barrel portion which is formed by tapering upwardly a caliber thereof from the straight barrel portion, and an inserting guide portion which is formed upwardly from the cone barrel portion and is horn-shaped; and the necking portion is formed at a boundary position between the cone barrel portion and the inserting guide portion.

10. The electrical connector of claim 9, wherein the mating portion has a first slit and a second slit, the first slit extends downwardly from an upper end of the inserting guide portion to the straight barrel portion and cut through the straight barrel portion, the second slit extends downwardly from the upper end of the inserting guide portion to the straight barrel portion but does not cut through the straight barrel portion, and the float connecting portion is connected to a lower end of the straight barrel portion and is positioned just below the second slit.

11. The electrical connector of claim 1, wherein
the terminal receiving groove and the float connecting portion have a gap therebetween, and
the terminal receiving groove has spacing members extending into and between various portions of the float connecting portion.

12. The electrical connector of claim 1, wherein
the insulative fixing seat comprises a main fixing seat and an auxiliary fixing seat coupled to the main fixing seat, the main fixing seat forming a horizontal lower wall surface of terminal fixing groove, and the auxiliary fixing seat is provided with a spacing block forming a horizontal upper wall surface of the terminal fixing groove, and the spacing block is interposed between the floating terminal and the horizontal fixing portion of the floating terminal.

13. The electrical connector of claim 12, wherein
the terminal receiving groove partitions an inner wall of the main fixing seat into two position-limiting walls which face each other, the two position-limiting walls are respectively provided with snapping grooves, and
the auxiliary fixing seat includes snapping blocks which respectively snap with the snapping grooves.

14. The electrical connector of claim 13, wherein
one of the two position-limiting walls of the main fixing seat is further provided with a stopping wall protruding into the terminal receiving groove.

15. The electrical connector of claim 1, wherein
the insulative floating seat comprises a barrel body which is barrel-shaped,
the annular groove is provided to an upper portion of the insulative floating seat and encircles around the barrel body, and
a protruding ring protruding outwardly is formed on an outer wall of the barrel body adjacent to below the annular groove.

16. The electrical connector of claim 1, wherein
the conductive shell comprises a sleeve portion which sheathes the insulative fixing seat,
the elastic mating pieces are distributed to be spaced apart from each other along an upper end of the sleeve portion and form a cage shape,
an upper end of each elastic mating piece bends toward a central axis of the conductive shell to form a bending hook, a tip of each bending hook extends into the annular groove, and
a lower end of the sleeve portion is provided with a soldering leg which extends outwardly.

17. An electrical connector assembly, comprising:
a male connector;
a main mounting housing which allows the male connector to insert therein; and
the electrical connector of claim 1 which inserts into and cooperates with the male connector;
the male connector comprising:
a metal shell;
a central conductive member which is received in the metal shell;
an insulative seat;
the central conductive member being fixed on the insulative seat, the insulative seat being interposed between the metal shell and the central conductive member; and
the central conductive member and the mating portion of the floating terminal correspondingly contacting to establish a first electrical connection, and the metal shell sheathing the conductive shell to establish a second electrical connection.

18. The electrical connector of claim 1, wherein the float connecting portion of the floating terminal includes a bending portion extending from the horizontal fixing portion, a straight extending portion extending from the bending portion and extending vertically, and at least one further bending portion and at least one further straight extending portion connected to and extending between the straight extending portion connected with the horizontal fixing portion and the mating portion.

* * * * *